US012608752B2

(12) United States Patent
Liu et al.

(10) Patent No.: US 12,608,752 B2
(45) Date of Patent: Apr. 21, 2026

(54) RENDERING RESOURCE-BASED DATA PROCESSING

(71) Applicant: Tencent Technology (Shenzhen) Company Limited, Guangdong (CN)

(72) Inventors: Jingyang Liu, Shenzhen (CN); Yandong Yang, Shenzhen (CN); Xinda Zhao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 131 days.

(21) Appl. No.: 18/771,911

(22) Filed: Jul. 12, 2024

(65) Prior Publication Data
US 2024/0370966 A1 Nov. 7, 2024

Related U.S. Application Data

(63) Continuation of application No. PCT/CN2023/119520, filed on Sep. 18, 2023.

(30) Foreign Application Priority Data

Oct. 27, 2022 (CN) .......................... 202211322550.6

(51) Int. Cl.
*G06T 1/20* (2006.01)
*A63F 13/52* (2014.01)
(52) U.S. Cl.
CPC ................. *G06T 1/20* (2013.01); *A63F 13/52* (2014.09)
(58) Field of Classification Search
CPC ......... G06T 1/20; G06T 15/005; A63F 13/52; A63F 2300/66; Y02D 10/00
See application file for complete search history.

(56) References Cited

U.S. PATENT DOCUMENTS 12,456,247 B2 * 10/2025 Yin ........................ G06T 15/005

FOREIGN PATENT DOCUMENTS

CN 104036534 A 9/2014
CN 113946402 A 1/2022
CN 115439586 A 12/2022

OTHER PUBLICATIONS

International Search Report issued in PCT/CN2023/119520, mailed on Dec. 26, 2023, 5 pages.

(Continued)

*Primary Examiner* — Tat C Chio
(74) *Attorney, Agent, or Firm* — ArentFox Schiff LLP

(57) ABSTRACT

A method includes generating a first pipeline configuration instruction for one or more to-be-rendered resources in response to a rendering trigger event, and performing an initial pipeline configuration through an initial pipeline interface according to the first pipeline configuration instruction, to obtain initial pipeline configuration information, the initial pipeline configuration information includes at least: a first to-be-rendered pipeline stage of a first to-be-rendered resource in the one or more to-be-rendered resources, a first rendering position of the first to-be-rendered resource, and a first to-be-rendered resource identifier of the first to-be-rendered resource. The method also includes transmitting the initial pipeline configuration information from a control device to a rendering device. Apparatus and non-transitory computer-readable storage medium counterpart embodiments are also contemplated.

20 Claims, 10 Drawing Sheets

(56)         References Cited

OTHER PUBLICATIONS

Office Action issued in Chinese Patent Application No. 202211322550.
6, mailed on Dec. 15, 2022, 20 pages.

* cited by examiner

Data processing system 100

Data support

Database 500

Server 600

Virtual pipeline configuration information and rendered video information

Network 400

Virtual pipeline configuration information and rendered video information

Real pipeline configuration and rendering

Graphical interface 310-1

Server 200

Terminal 300

Server 200

Second memory 250

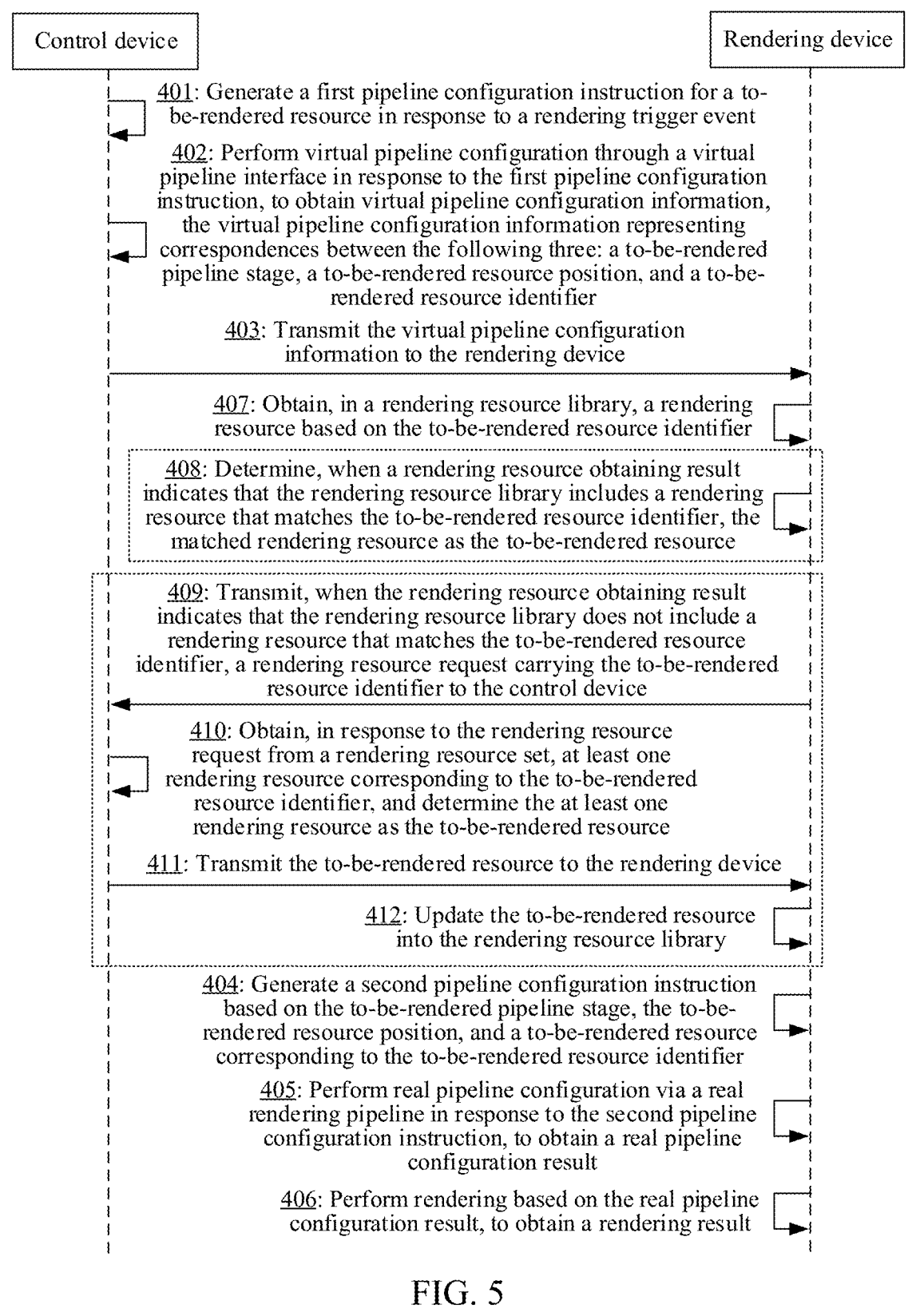

| Control device | | Rendering device |
|---|---|---|

401: Generate a first pipeline configuration instruction for a to-be-rendered resource in response to a rendering trigger event 402: Perform virtual pipeline configuration through a virtual pipeline interface in response to the first pipeline configuration instruction, to obtain virtual pipeline configuration information, the virtual pipeline configuration information representing correspondences between the following three: a to-be-rendered pipeline stage, a to-be-rendered resource position, and a to-be-rendered resource identifier 403: Transmit the virtual pipeline configuration information to the rendering device 407: Obtain, in a rendering resource library, a rendering resource based on the to-be-rendered resource identifier 408: Determine, when a rendering resource obtaining result indicates that the rendering resource library includes a rendering resource that matches the to-be-rendered resource identifier, the matched rendering resource as the to-be-rendered resource 409: Transmit, when the rendering resource obtaining result indicates that the rendering resource library does not include a rendering resource that matches the to-be-rendered resource identifier, a rendering resource request carrying the to-be-rendered resource identifier to the control device 410: Obtain, in response to the rendering resource request from a rendering resource set, at least one rendering resource corresponding to the to-be-rendered resource identifier, and determine the at least one rendering resource as the to-be-rendered resource 411: Transmit the to-be-rendered resource to the rendering device 412: Update the to-be-rendered resource into the rendering resource library 404: Generate a second pipeline configuration instruction based on the to-be-rendered pipeline stage, the to-be-rendered resource position, and a to-be-rendered resource corresponding to the to-be-rendered resource identifier 405: Perform real pipeline configuration via a real rendering pipeline in response to the second pipeline configuration instruction, to obtain a real pipeline configuration result 406: Perform rendering based on the real pipeline configuration result, to obtain a rendering result

FIG. 5

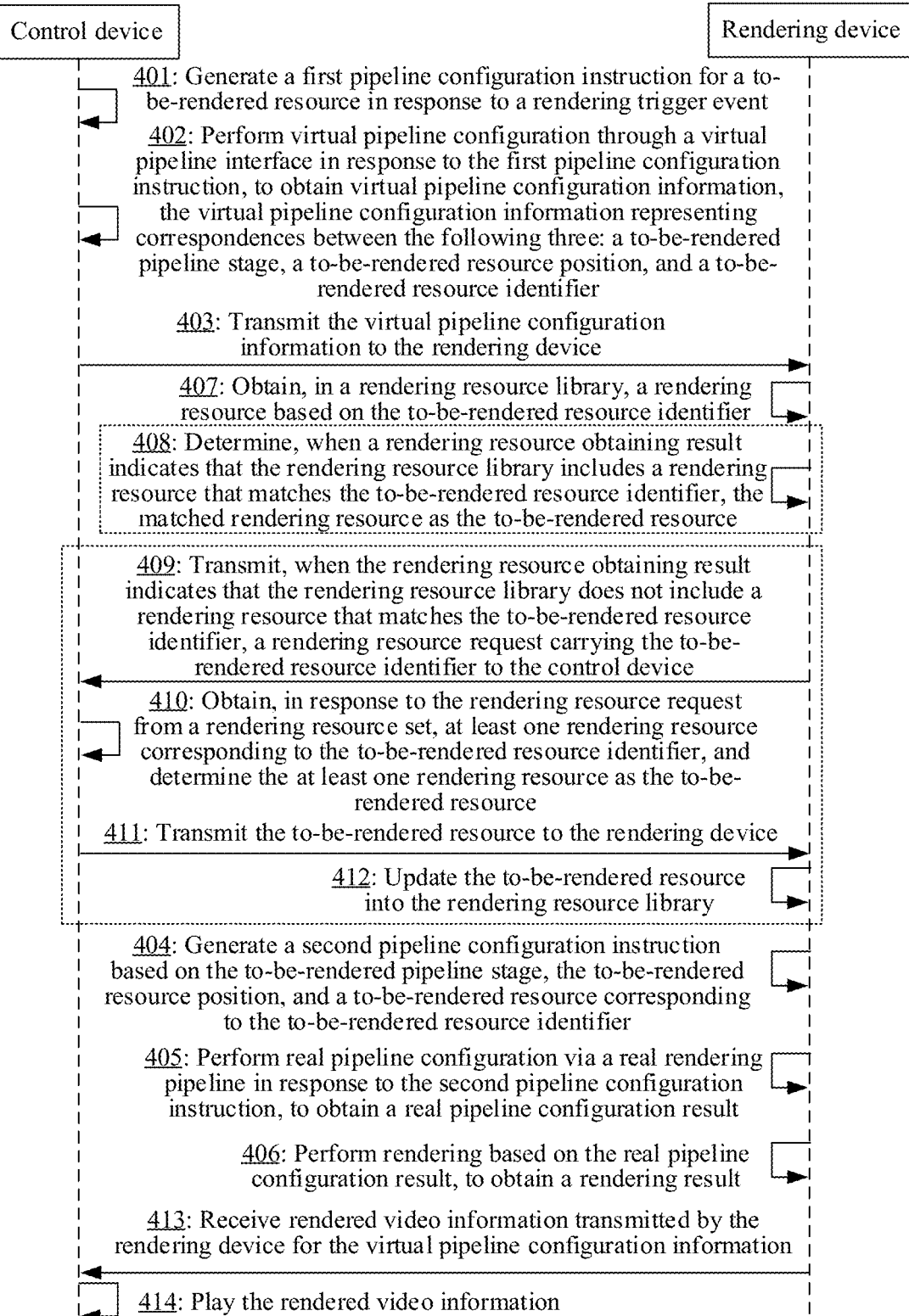

| Control device | | Rendering device |
| --- | --- | --- |

401: Generate a first pipeline configuration instruction for a to-be-rendered resource in response to a rendering trigger event 402: Perform virtual pipeline configuration through a virtual pipeline interface in response to the first pipeline configuration instruction, to obtain virtual pipeline configuration information, the virtual pipeline configuration information representing correspondences between the following three: a to-be-rendered pipeline stage, a to-be-rendered resource position, and a to-be-rendered resource identifier 403: Transmit the virtual pipeline configuration information to the rendering device 407: Obtain, in a rendering resource library, a rendering resource based on the to-be-rendered resource identifier 408: Determine, when a rendering resource obtaining result indicates that the rendering resource library includes a rendering resource that matches the to-be-rendered resource identifier, the matched rendering resource as the to-be-rendered resource 409: Transmit, when the rendering resource obtaining result indicates that the rendering resource library does not include a rendering resource that matches the to-be-rendered resource identifier, a rendering resource request carrying the to-be-rendered resource identifier to the control device 410: Obtain, in response to the rendering resource request from a rendering resource set, at least one rendering resource corresponding to the to-be-rendered resource identifier, and determine the at least one rendering resource as the to-be-rendered resource 411: Transmit the to-be-rendered resource to the rendering device 412: Update the to-be-rendered resource into the rendering resource library 404: Generate a second pipeline configuration instruction based on the to-be-rendered pipeline stage, the to-be-rendered resource position, and a to-be-rendered resource corresponding to the to-be-rendered resource identifier 405: Perform real pipeline configuration via a real rendering pipeline in response to the second pipeline configuration instruction, to obtain a real pipeline configuration result 406: Perform rendering based on the real pipeline configuration result, to obtain a rendering result 413: Receive rendered video information transmitted by the rendering device for the virtual pipeline configuration information 414: Play the rendered video information

FIG. 6

RENDERING RESOURCE-BASED DATA PROCESSING

RELATED APPLICATIONS

The present application is a continuation of International Application No. PCT/CN2023/119520, filed on Sep. 18, 2023, which claims priority to Chinese Patent Application No. 202211322550.6 filed on Oct. 27, 2022. The entire disclosures of the prior applications are hereby incorporated by reference.

FIELD OF THE TECHNOLOGY

This application relates to a rendering technology in the field of computer applications, including techniques for a rendering resource-based data processing.

BACKGROUND OF THE DISCLOSURE

During a rendering process, to improve rendering efficiency, calculation and rendering are often distributed and performed on different devices in an asynchronous manner. For example, a control device performs data calculation and a rendering device performs rendering. In this way, the control device needs to send a rendering instruction to the rendering device, to enable the rendering device to implement rendering based on the rendering instruction. However, the rendering instruction often carries various rendering resources for rendering, affecting a data transmission volume of the rendering instruction and affecting the rendering efficiency.

SUMMARY

Embodiments of this disclosure provide a rendering resource-based data processing method, an apparatus, a device, a computer-readable storage medium, and a computer program product, which can improve rendering efficiency.

Technical solutions in embodiments of this disclosure are implemented as follows.

An embodiment of this disclosure provides a rendering resource-based data processing method. The method is performed by a control device, and includes generating a first pipeline configuration instruction for one or more to-be-rendered resources in response to a rendering trigger event, and performing an initial pipeline configuration through an initial pipeline interface according to the first pipeline configuration instruction, to obtain initial pipeline configuration information, the initial pipeline configuration information includes at least: a first to-be-rendered pipeline stage of a first to-be-rendered resource in the one or more to-be-rendered resources, a first rendering position of the first to-be-rendered resource, and a first to-be-rendered resource identifier of the first to-be-rendered resource. The method also includes transmitting the initial pipeline configuration information from the control device to a rendering device. The rendering device is configured to generate a second pipeline configuration instruction based on the initial pipeline configuration information, perform a pipeline configuration through a pipeline interface according to the second pipeline configuration instruction to obtain a pipeline configuration result, and perform a rendering based on the pipeline configuration result.

An embodiment of this disclosure further provides a rendering resource-based data processing method. The method is performed by a rendering device, and includes receiving initial pipeline configuration information that is transmitted by a control device, the initial pipeline configuration information is obtained by the control device according to a first pipeline configuration instruction and includes at least a first to-be-rendered pipeline stage of a first to-be-rendered resource, a first to-be-rendered resource position of the first to-be-rendered resource, and a first to-be-rendered resource identifier of the first to-be-rendered resource. The method also includes generating, by the rendering device, a second pipeline configuration instruction based on the initial pipeline configuration information, performing, by the rendering device, a pipeline configuration via a rendering pipeline interface according to the second pipeline configuration instruction, to obtain pipeline configuration information; and performing, by the rendering device, a rendering based on the pipeline configuration information, to obtain a rendering result.

An embodiment of this disclosure provides a first data processing apparatus, including:

a rendering trigger module, configured to generate a first pipeline configuration instruction for a to-be-rendered resource in response to a rendering trigger event;

a virtual configuration module, configured to perform virtual pipeline configuration through a virtual pipeline interface in response to the first pipeline configuration instruction, to obtain virtual pipeline configuration information, the virtual pipeline configuration information representing correspondences between the following three pieces of information: a to-be-rendered pipeline stage, a to-be-rendered resource position, and a to-be-rendered resource identifier of the to-be-rendered resource; and an information synchronization module, configured to transmit the virtual pipeline configuration information to a rendering device, the rendering device being configured to generate a second pipeline configuration instruction based on the virtual pipeline configuration information, perform real pipeline configuration through a real pipeline interface in response to the second pipeline configuration instruction, and perform rendering based on a real pipeline configuration result.

An embodiment of this disclosure provides a second data processing apparatus, including:

an information receiving module, configured to receive virtual pipeline configuration information transmitted by a control device, the virtual pipeline configuration information being obtained by the control device performing virtual pipeline configuration in response to a first pipeline configuration instruction, the first pipeline configuration instruction being generated by the control device in response to a rendering trigger event, the virtual pipeline configuration being implemented through a virtual pipeline interface, and the virtual pipeline configuration information representing correspondences between the following three pieces of information: a to-be-rendered pipeline stage, a to-be-rendered resource position, and a to-be-rendered resource identifier;

an instruction restoration module, configured to generate a second pipeline configuration instruction based on the to-be-rendered pipeline stage, the to-be-rendered resource position, and a to-be-rendered resource corresponding to the to-be-rendered resource identifier;

a pipeline configuration module, configured to perform real pipeline configuration via a real rendering pipeline in response to the second pipeline configuration instruction, to obtain a real pipeline configuration result; and an information rendering module, configured to perform rendering based on the real pipeline configuration result, to obtain a rendering result.

An embodiment of this disclosure provides a control device for data processing, including:

a first memory, configured to store a computer program or computer-executable instructions; and a first processor (also referred to as first processing circuitry), configured to implement, when executing the computer program or the computer-executable instructions stored in the first memory, the data processing method applied to the control device provided in embodiments of this disclosure.

An embodiment of this disclosure provides a rendering device for data processing, including:

a second memory, configured to store a computer program or computer-executable instructions; and a second processor (also referred to as second processing circuitry), configured to implement, when executing the computer program or the computer-executable instructions stored in the second memory, the data processing method applied to the rendering device provided in embodiments of this disclosure.

An embodiment of this disclosure provides a non-transitory computer-readable storage medium, having a computer program or computer-executable instructions stored thereon. The computer program or the computer-executable instructions are configured for implementing, when being executed by a first processor, the data processing method applied to the control device provided in embodiments of this disclosure; or the computer program or the computer-executable instructions are configured for implementing, when being executed by a second processor, the data processing method applied to a rendering device provided in embodiments of this disclosure.

An embodiment of this disclosure provides a computer program product, including a computer program or computer-executable instructions, the computer program or the computer-executable instructions implementing, when being executed by a first processor, the data processing method applied to the control device provided in embodiments of this disclosure; or the computer program or the computer-executable instructions implementing, when being executed by a second processor, the data processing method applied to a rendering device provided in embodiments of this disclosure.

Embodiments of this disclosure have at least the following beneficial effects: After a first pipeline configuration instruction for a to-be-rendered resource is obtained in response to a rendering trigger event, virtual pipeline configuration information is first obtained through a virtual pipeline interface, the virtual pipeline configuration information is transmitted to a rendering device, a second pipeline configuration instruction is then restored on the rendering device by parsing the virtual pipeline configuration information, and real pipeline configuration is performed through a real pipeline interface in response to the second pipeline configuration instruction, so that rendering is performed based on a real pipeline configuration result. In this way, the rendering is implemented by the rendering device that is independent of a control device, and the virtual pipeline interface is constructed, so that the virtual pipeline configuration information is transmitted to the rendering device in response to the first pipeline configuration instruction. The virtual pipeline configuration information represents correspondences between a rendering pipeline stage, a resource rendering position, and a rendering resource identifier. This reduces a data transmission volume during an asynchronous rendering process, and can improve rendering efficiency.

BRIEF DESCRIPTION OF THE DRAWINGS

FIG. 5 is a second schematic flowchart of a data processing method according to an embodiment of this disclosure.

FIG. 6 is a third schematic flowchart of a data processing method according to an embodiment of this disclosure.

DESCRIPTION OF EMBODIMENTS

Figure 1:
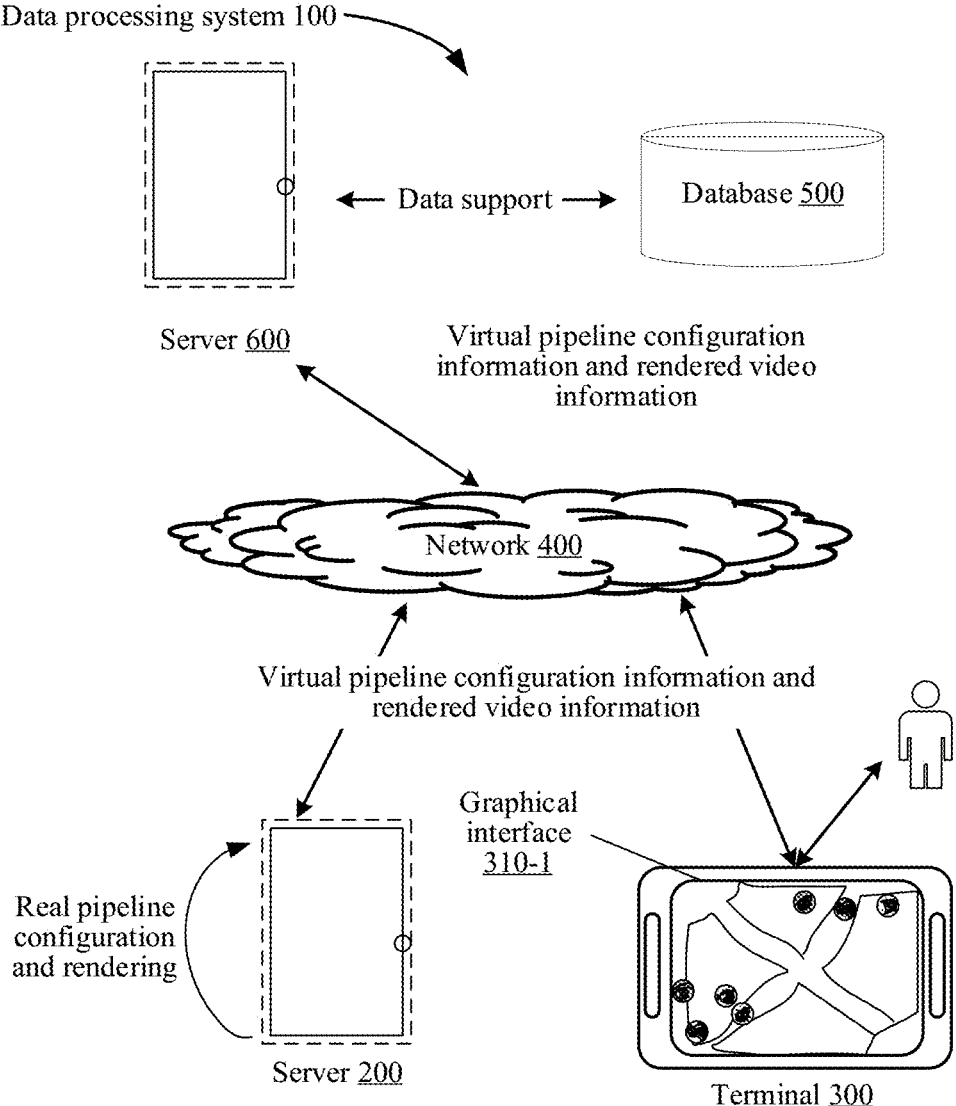
FIG. 1 is a schematic diagram of an architecture of a data processing system according to an embodiment of this disclosure.

The following describes technical solutions in embodiments of this disclosure with reference to the accompanying drawings. The described embodiments are some of the embodiments of this disclosure rather than all of the embodiments. Other embodiments are within the scope of this disclosure.

In the following description, the term "some embodiments" describes subsets of all possible embodiments, but "some embodiments" may be the same subset or different subsets of all possible embodiments, and can be combined with each other without conflict.

In the following description, the term "first/second" involved is configured for distinguishing similar objects and does not represent a specific order of objects. The term "first/second" may be interchanged with a specific order or priority if permitted, so that embodiments of this disclosure described here may be implemented in an order other than that illustrated or described here.

Unless otherwise defined, meanings of all technical and scientific terms used in embodiments of this disclosure are the same as those usually understood by a person skilled in the art to which this disclosure belongs. Terms used in embodiments of this disclosure are merely intended to describe the objectives of embodiments of this disclosure, but are not intended to limit this disclosure.

Before embodiments of this disclosure are further described in detail, a description is made on terms in embodiments of this disclosure, and the terms in embodiments of this disclosure are applicable to the following explanations.

(1) Artificial intelligence (AI): It is a theory, a method, a technology, and an application system that use a digital computer or a machine controlled by the digital computer to simulate, extend, and expand human intelligence, perceive an environment, obtain knowledge, and use knowledge to obtain an optimal result.

(2) Machine learning (ML): It is a multi-field interdiscipline that relates to a plurality of disciplines such as the probability theory, statistics, the approximation theory, convex analysis, and the algorithm complexity theory. The machine learning is configured for studying how a computer simulates or implements a human learning behavior to obtain new knowledge or skills. The machine learning reorganizes an existing knowledge structure, to keep improving its own performance. The machine learning is a core of the artificial intelligence, is a basic way to make the computer intelligent, and is applied to various fields of the artificial intelligence. The machine learning generally includes technologies such as an artificial neural network, a belief network, reinforcement learning, transfer learning, and inductive learning.

(3) Artificial neural network: It is a mathematical model that imitates a structure and function of a biological neural network. An exemplary structure of the artificial neural network in embodiments of this disclosure includes a graph convolutional network (GCN, a neural network for processing graph-structured data), a deep neural network (DNN), a convolutional neural network (CNN), a recurrent neural network (RNN), a neural state machine (NSM), and a phase-functioned neural network (PFNN), and the like. In embodiments of this disclosure, a control device may perform data calculation by using a corresponding model of an artificial neural network, such as determining motion information of a virtual object by using a neural network model.

(4) Rendering pipeline: It is a functional module that performs calculation by using a graphics processing unit (GPU) to implement rendering. The rendering pipeline is also referred to as a real rendering pipeline in embodiments of this disclosure.

(5) Resource creation: It is configured for converting compressed or packed resources stored in a file from a storage format to a format used by a rendering pipeline for rendering.

(6) In response to: It is configured for representing a condition or state on which a performed operation relies. If the condition or state is satisfied, one or more performed operations may be real-time or have a set delay. There is no limit to a sequence on the plurality of performed operations unless otherwise specified.

(7) Virtual scene: It is a virtual scene displayed on a cloud server for audio and video information sent by an application running the cloud server. The virtual scene may be a simulation environment, a semi-simulation and semi-fictional environment for the real world, or a pure fictional environment. The virtual scene may be any one of a two-dimensional virtual scene, a two-and-a-half-dimensional virtual scene, or a three-dimensional virtual scene. A dimension of the virtual scene is not limited in embodiments of this disclosure. For example, the virtual scene may include sky, land, sea, and the like. The land may include environmental elements such as a desert and a city. A user may control movement of a virtual object in the virtual scene. Rendered video information in embodiments of this disclosure may be a virtual scene, an animation, or the like.

(8) Virtual object: It is images of various people and objects that may interact in a virtual scene, or a movable object in the virtual scene, or a virtual prop in the virtual scene. The movable object may be a virtual character, a virtual animal, an animation character, and the like, such as a person and an animal displayed in the virtual scene. The virtual object may be a virtual image that is in the virtual scene and that is configured for representing a user. The virtual scene may include a plurality of virtual objects, and each virtual object has a shape and a volume in the virtual scene, and occupies a part of space in the virtual scene.

(9) Client: It is an application running in a device for providing various services, such as a game client, an emulation client, and a video client.

(10) Cloud computing: It is a computing mode, in which computing tasks are distributed on a resource pool formed by a large quantity of computers, so that various application systems can acquire computing power (or computing capacity), storage space, and information services according to requirements. A network that provides resources to the resource pool is referred to as a "cloud". For a user, resources in the "cloud" seem to be infinitely expandable, and can be obtained readily, used on demand, expanded readily, and paid for according to usage. The rendering resource-based data processing method provided in embodiments of this disclosure is implemented by the cloud computing.

(11) Cloud gaming: It is an online gaming technology based on a cloud computing technology, also be referred to as gaming on demand. Cloud gaming technology enables a thin client with lower graphics processing and data computing capabilities than specified capabilities to run games smoothly. In a cloud gaming scenario, the game is not run on a player gaming terminal, but in a cloud server, and a game scene is rendered by the cloud server into audio and video streams for transmitting the audio and video streams over a network to the player gaming terminal. Even if graphics computing and data processing capabilities of the player gaming terminal are lower than specified capabilities, the game can be run with a basic streaming media playback capability and a capability to acquire player input instructions and send the player input instructions to the cloud server. The rendering resource-based data processing method provided in embodiments of this disclosure may be applied in the cloud gaming scenario.

During a rendering process, to improve rendering efficiency, data calculation and rendering are often distributed and performed on different devices in an asynchronous manner. For example, a control device performs data calculation and a rendering device performs rendering. In this way, the control device needs to send a rendering instruction to the rendering device, to enable the rendering device to implement rendering based on the rendering instruction. However, the rendering instruction often carries various rendering resources for rendering, affecting a data transmission volume of the rendering instruction and affecting the rendering efficiency.

For example, in a process of streaming a rendering instruction of an open graphics library (OpenGL) to transmitting a streamed instruction stream over Ethernet to a rendering server for rendering, a data transmission volume is increased because all rendering resources are carried in the transmitted streamed instruction stream, and rendering efficiency is affected.

In addition, to improve the rendering efficiency, asynchrony of data calculation and rendering can also be achieved by using rendering hardware such as an external rendering box. The external rendering box is rendering hardware to which an underlying rendering request is transmitted through an interface such as a thunderbolt interface or a universal serial bus (USB). The underlying rendering request is transmitted data in a transmission layer that matches a thunderbolt protocol and carries all the rendering resources. Therefore, a data transmission volume is large and rendering efficiency is affected.

Based on this, embodiments of this disclosure provide a rendering resource-based data processing method, an apparatus, a device, a computer-readable storage medium, and a computer program product, which can decrease a data transmission volume and improve rendering efficiency. The following describes exemplary applications of a device provided in embodiments of this disclosure. The control device and the rendering device provided in embodiments of this disclosure may both be implemented as various types of terminals, such as a smartphone, a smart watch, a notebook computer, a tablet computer, a desktop computer, a smart home appliance, a set-top box, a smart on board device, a portable music player, a personal digital assistant, a dedicated messaging device, a smart voice interaction device, a portable game device, and a smart speaker, or may alternatively be implemented as a server. An exemplary application when the control device is implemented as a terminal and the rendering device is implemented as a server is described below.

FIG. 1 is a schematic diagram of an architecture of a data processing system according to an embodiment of this disclosure. As shown in FIG. 1, to support a data processing application, in a data processing system 100, a terminal 300 (referred to as a control device) is connected to a server 200 (referred to as a rendering device) via a network 400 and a server 600. The network 400 may be a wide area network or a local area network, or a combination thereof. In addition, the data processing system 100 further includes a database 500 for providing data support to the server 600. Moreover, what is shown in FIG. 1 is a case in which the database 500 is independent of the server 600. In addition, the database 500 may alternatively be integrated in the server 600. This is not limited in this embodiment of this disclosure.

The terminal 300 is configured to: generate a first pipeline configuration instruction for a to-be-rendered resource in response to a rendering trigger event; perform virtual pipeline configuration (also referred to as initial pipeline configuration) through a virtual pipeline interface (also referred to as initial pipeline interface) in response to the first pipeline configuration instruction, to obtain virtual pipeline configuration information (also referred to as initial pipeline configuration information), the virtual pipeline configuration information representing correspondences between the following three pieces of information: a to-be-rendered pipeline stage, a to-be-rendered resource position, and a to-be-rendered resource identifier of the to-be-rendered resource; and transmit the virtual pipeline configuration information to the server 200 via the network 400 and the server 600. The terminal 300 is further configured to receive, via the network 400 and the server 600, rendered video information transmitted by the server 200, and play the rendered video information on a graphical interface (for example, a graphical interface 310-1 is shown).

The server 200 is configured to: receive, via the network 400 and the server 600, the virtual pipeline configuration information transmitted by the terminal 300; generate a second pipeline configuration instruction based on the to-be-rendered pipeline stage, the to-be-rendered resource position, and a to-be-rendered resource corresponding to the to-be-rendered resource identifier; perform real pipeline configuration via a real rendering pipeline in response to the second pipeline configuration instruction, to obtain a real pipeline configuration result; and perform rendering based on the real pipeline configuration result, to obtain a rendering result. The server 200 is further configured to transmit the rendered video information to the terminal 300 via the network 400 and the server 600 based on the rendering result.

In some embodiments, the server 200 and the server 600 may be independent physical servers, or server clusters or distributed systems including a plurality of physical servers, or cloud servers providing basic cloud computing services, such as cloud services, cloud databases, cloud computing, cloud functions, cloud storage network services, cloud communication, middleware services, domain name services, security services, content delivery networks (CDNs), and big data and artificial intelligence platforms. The terminal and the server may be connected directly or indirectly in a wired or wireless communication manner. This is not limited in this embodiment of this disclosure.

Figure 2:
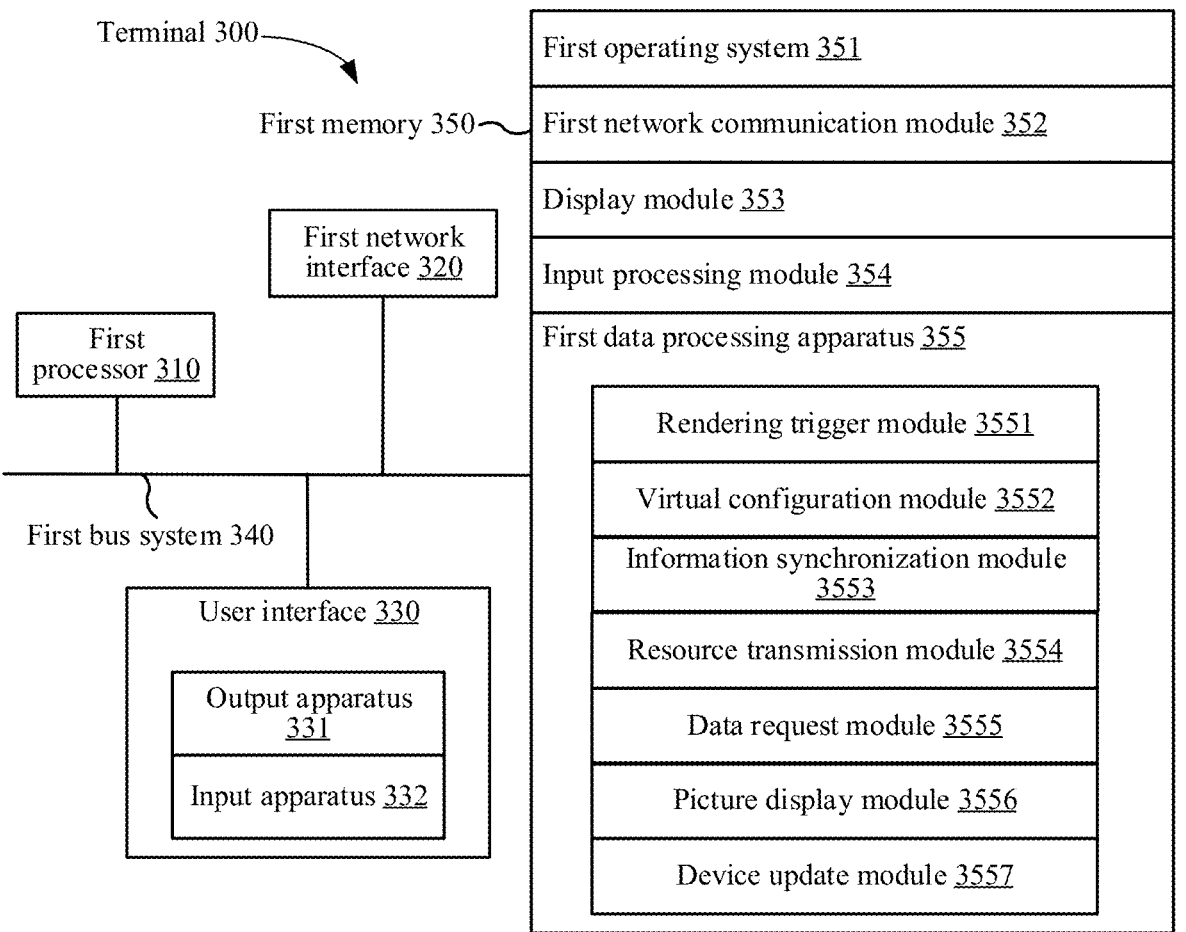
FIG. 2 is a schematic diagram of a structure of a terminal in FIG. 1 according to an embodiment of this disclosure.

FIG. 2 is a schematic diagram of a structure of a terminal in FIG. 1 according to an embodiment of this disclosure. The terminal 300 shown in FIG. 2 includes: at least one first processor 310, a first memory 350, at least one first network interface 320, and a user interface 330. Components in the terminal 300 are coupled together via a first bus system 340. The first bus system 340 is configured to implement connections and communication between the components. In addition to a data bus, the first bus system 340 also includes a power bus, a control bus, and a status signal bus. However, for case of clear description, various buses are marked as the first bus system 340 in FIG. 2.

The first processor 310 may be an integrated circuit chip with a signal processing capability, such as a general-purpose processor, a digital signal processor (DSP), or another programmable logic device, a discrete gate or a transistor logic device, and a discrete hardware component. The general-purpose processor may be a microprocessor, or any conventional processor, or the like.

The user interface 330 includes one or more output apparatuses 331 that present media content, including one or more speakers and/or one or more visual display screens. The user interface 330 further includes one or more input apparatuses 332 including a user interface component that facilitates a user input, for example, a keyboard, a mouse, a microphone, a touch display screen, a camera, and another input button and control.

The first memory 350 may be removable, non-removable, or a combination thereof. For example, a hardware device includes a solid-state memory, a hard disk drive, an optical drive, and the like. In one embodiment, the first memory 350 includes one or more storage devices physically located away from the first processor 310.

The first memory 350 includes a volatile memory or a non-volatile memory, or may include both a volatile memory and a non-volatile memory. The non-volatile memory may be a read-only memory (ROM), and the volatile memory may be a random-access memory (RAM). The first memory 350 described in this embodiment of this disclosure is intended to include any suitable type of memories.

In some embodiments, the first memory 350 can store data to support various operations, examples of the data include a program, a module, and a data structure, or a subset or superset thereof. Examples are described below.

A first operating system 351 includes system programs for processing various basic system services and performing hardware-related tasks, for example, a frame layer, a core library layer, and a drive layer, and is configured to implement various basic services and process hardware-based tasks.

A first network communication module 352 is configured to reach another computing device via one or more (wired or wireless) first network interfaces 320. For example, the first network interface 320 includes: Bluetooth, wireless fidelity (Wi-Fi), a universal serial bus (USB), and the like.

A display module 353 is configured to present information by one or more output apparatuses 331 (for example, display screens and speakers) associated with the user interface 330 (for example, a user interface configured to operate a peripheral device and display content and information).

An input processing module 354 is configured to detect one or more user inputs or interactions from one of the one or more input apparatuses 332 and translate the detected inputs or interactions.

In some embodiments, a first data processing apparatus provided in an embodiment of this disclosure may be implemented by using software. FIG. 2 shows a first data processing apparatus 355 stored in the first memory 350. The first data processing apparatus 355 may be software in the form of a program and a plug-in, and includes the following software modules: a rendering trigger module 3551, a virtual configuration module 3552, an information synchronization module 3553, a resource transmission module 3554, a data request module 3555, a picture display module 3556, and a device update module 3557. These modules are logical modules, and therefore may be randomly combined or further divided based on functions to be implemented. The functions of the modules are described below.

Figure 3:
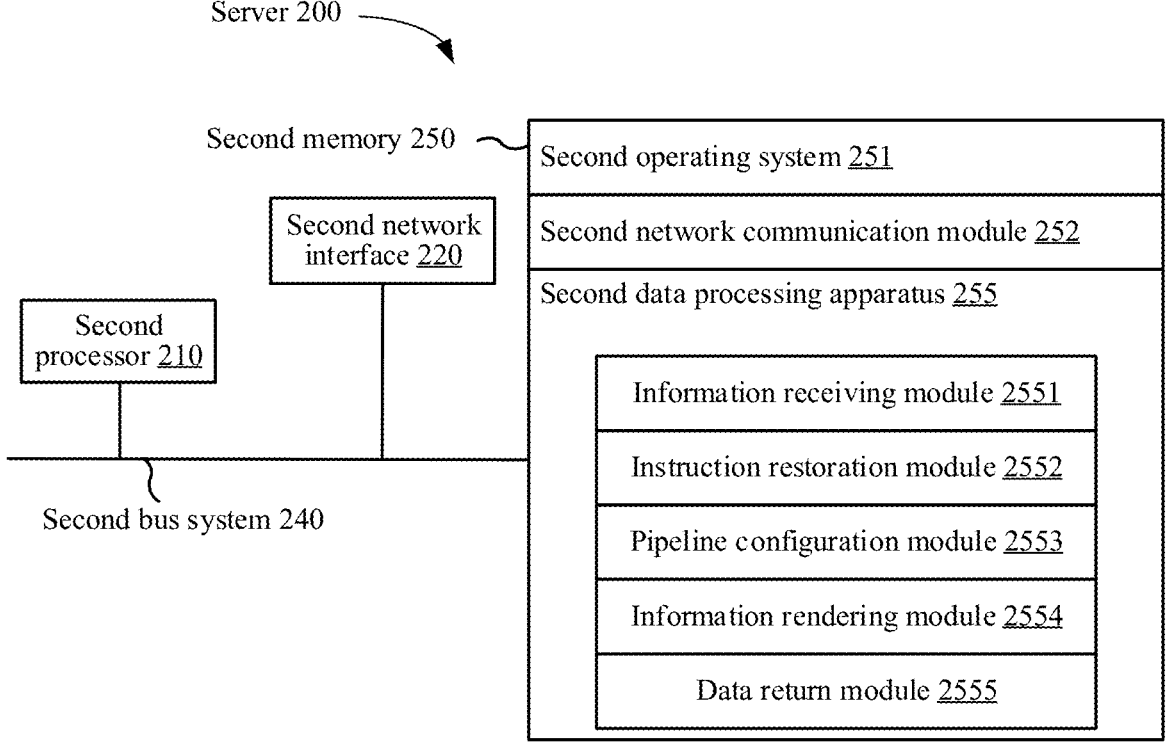
FIG. 3 is a schematic diagram of a structure of a server in FIG. 1 according to an embodiment of this disclosure.

FIG. 3 is a schematic diagram of a structure of a server in FIG. 1 according to an embodiment of this disclosure. The server 200 shown in FIG. 3 includes: at least one second processor 210, a second memory 250, and at least one second network interface 220. Components in the server 200 are coupled together via a second bus system 240. The second bus system 240 is configured to implement connections and communication between the components. In addition to a data bus, the second bus system 240 also includes a power bus, a control bus, and a status signal bus. However, for case of clear description, various buses are marked as the second bus system 240 in FIG. 3.

The second processor 210 may be an integrated circuit chip with a signal processing capability, such as a general-purpose processor, a digital signal processor, or another programmable logic device, a discrete gate or a transistor logic device, and a discrete hardware component. The general-purpose processor may be a microprocessor or any conventional processor, or the like.

The second memory 250 may be removable, non-removable, or a combination thereof. For example, a hardware device includes a solid-state memory, a hard disk drive, an optical drive, and the like. In one embodiment, the second memory 250 includes one or more storage devices physically located away from the second processor 210.

The second memory 250 includes a volatile memory or a non-volatile memory, or may include both a volatile memory and a non-volatile memory. The non-volatile memory may be a read-only memory, and the volatile memory may be a random-access memory. The second memory 250 described in this embodiment of this disclosure is intended to include any suitable type of memories.

In some embodiments, the second memory 250 can store data to support various operations, examples of the data include a program, a module, and a data structure, or a subset or superset thereof. Examples are described below.

A second operating system 251 includes system programs for processing various basic system services and performing hardware-related tasks, for example, a frame layer, a core library layer, and a drive layer, and is configured to implement various basic services and process hardware-based tasks.

A second network communication module 252 is configured to reach another computing device via one or more (wired or wireless) second network interfaces 220. For example, the second network interface 220 includes: Bluetooth, wireless fidelity, a universal serial bus, and the like.

In some embodiments, a second data processing apparatus provided in an embodiment of this disclosure may be implemented by using software. FIG. 3 shows a second data processing apparatus 255 stored in the second memory 250. The second data processing apparatus 255 may be software in the form of a program and a plug-in, and includes the following software modules: an information receiving module 2551, an instruction restoration module 2552, a pipeline configuration module 2553, an information rendering module 2554, and a data return module 2555. These modules are logical modules, and therefore may be randomly combined or further divided based on functions to be implemented. The functions of the modules are described below.

In some embodiments, the apparatus provided in this embodiment of this disclosure may be implemented in a hardware manner. As an example, the apparatus provided in this embodiment of this disclosure may be a processor in the form of a hardware decoding processor. The processor is programmed to perform the rendering resource-based data processing method provided in embodiments of this disclosure. For example, the processor in the form of a hardware decoding processor may use one or more application specific integrated circuits (ASICs), DSPs, programmable logic devices (PLDs), complex programmable logic devices (CPLDs), field-programmable gate arrays (FPGAs), or other electronic components.

In some embodiments, the terminal may implement the rendering resource-based data processing method provided in embodiments of this disclosure by running a computer program. For example, the computer program may be a native program or a software module in an operating system; may be a native application (APP), to be specific, a program that needs to be installed in the operating system to run, such as a game APP, a video APP, or an instant messaging APP; or may be a mini program, to be specific, a program that only needs to be downloaded into a browser environment to run; or may be a mini program that may be embedded in any APP. In conclusion, the foregoing computer program may be any form of application, module, or plug-in.

The rendering resource-based data processing method provided in embodiments of this disclosure is described below with reference to the exemplary application and implementation of the device provided in embodiments of this disclosure. In addition, the rendering resource-based data processing method provided in embodiments of this disclosure is applied to various rendering scenarios such as a cloud technology, artificial intelligence, intelligent traffic, a vehicle, and a game.

Figure 4:
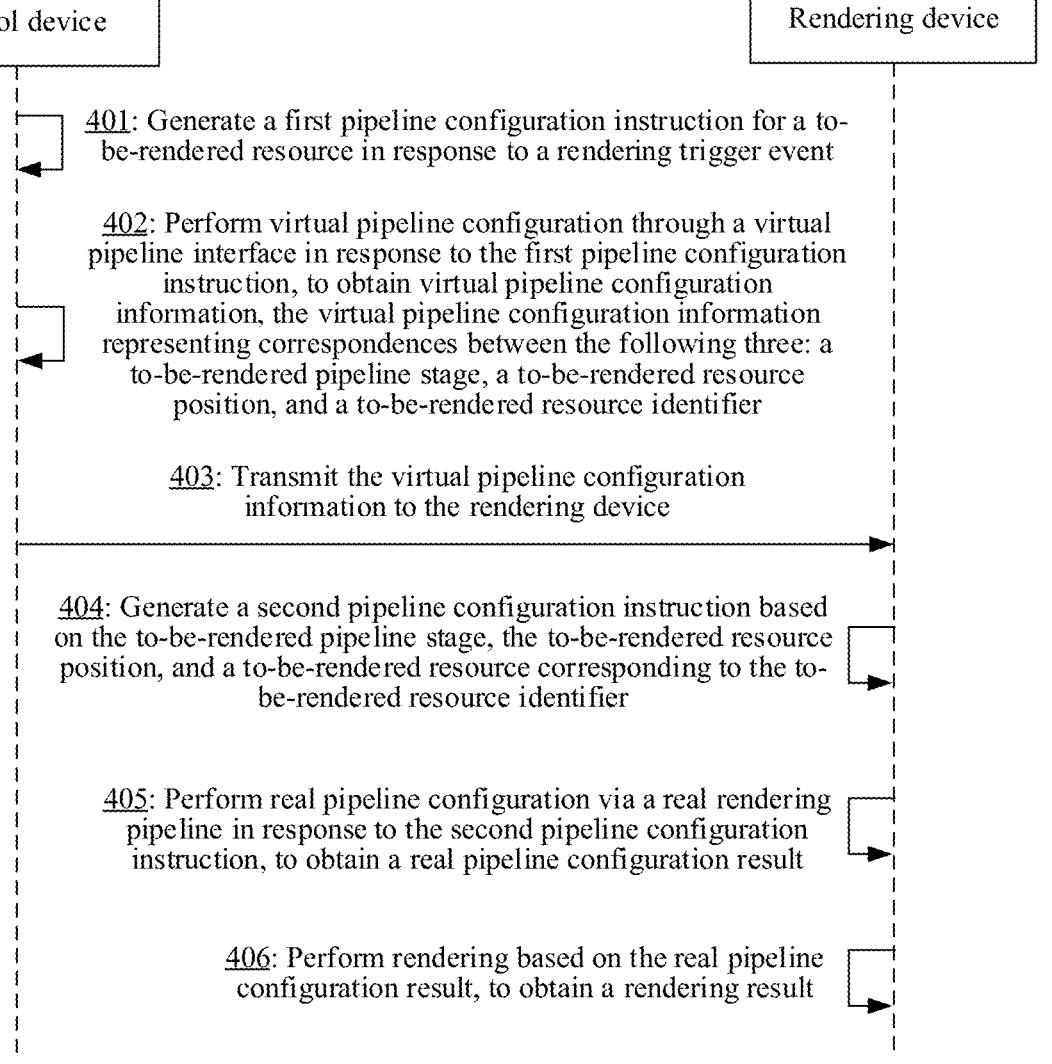
FIG. 4 is a first schematic flowchart of a data processing method according to an embodiment of this disclosure.

FIG. 4 is a first schematic flowchart of a data processing method according to an embodiment of this disclosure, which is described with reference to operations shown in FIG. 4.

Operation 401: A control device generates a first pipeline configuration instruction for a to-be-rendered resource in response to a rendering trigger event.

In this embodiment of this disclosure, when the control device detects an event for triggering rendering, the rendering trigger event is obtained. In this case, the control device starts rendering processing in response to the rendering trigger event. First, the control device generates an instruction configured for instructing pipeline configuration, referred to as the first pipeline configuration instruction herein.

The control device is a device running a client, such as a terminal running a game application, or such as a cloud server running a cloud gaming application. In addition, the running client relates to rendering processing based on a rendering resource. The rendering resource means a resource for rendering, including a model, a map, a material, a shader, and the like. The rendering trigger event means an event for triggering rendering, such as receiving an operation of a user for rendering, starting a game client or animation client, detecting a specified event for triggering rendering, or receiving an instruction from another device for instructing rendering. The pipeline configuration means a process of configuring the rendering resource at a resource position at a rendering stage, such as a process of configuring the rendering resource such as each texture at a specified position (referred to as the resource position) when the rendering stage is a geometry stage. In addition, the first pipeline configuration instruction may be generated, in response to the rendering trigger event, by a rendering engine running on the control device.

The to-be-rendered resource is obtained by resource creation. The resource creation is triggered by the control device in response to the rendering trigger event, and the resource creation represents a process of converting a resource in a storage format to a resource in a pipeline format. The pipeline format is a format used by a rendering pipeline. In this way, that a control device generates a first pipeline configuration instruction for a to-be-rendered resource in response to a rendering trigger event includes: The control device converts the resource in the storage format to a to-be-rendered resource in a rendering pipeline format in response to the rendering trigger event, and generates the first pipeline configuration instruction for the to-be-rendered resource.

Operation 402: The control device performs virtual pipeline configuration through a virtual pipeline interface in response to the first pipeline configuration instruction, to obtain virtual pipeline configuration information, the virtual pipeline configuration information representing correspondences between the following three pieces of information: a to-be-rendered pipeline stage, a to-be-rendered resource position, and a to-be-rendered resource identifier.

In this embodiment of this disclosure, because the first pipeline configuration instruction is configured for instructing to perform the pipeline configuration, the control device performs the pipeline configuration in response to the first pipeline configuration instruction after generating the first pipeline configuration instruction. Because the virtual pipeline interface is provided in the control device and rendering is performed on a rendering device, the control device performs the virtual pipeline configuration in response to the first pipeline configuration instruction through the virtual pipeline interface, and an obtained result is the virtual pipeline configuration information. The rendering device is a device independent of the control device and configured to perform rendering. In other words, the rendering device is a device other than the control device and configured to provide a rendering service for a client of the control device. In addition, the rendering device may be a single device or may be a cluster of devices. This is not limited in this embodiment of this disclosure.

The virtual pipeline interface means a virtual pipeline interface for responding to the first pipeline configuration instruction, and is simulated based on a real pipeline interface. Same as the real pipeline interface, both the virtual pipeline interface and the real pipeline interface are able to execute the pipeline configuration instruction (that is, an instruction for instructing to perform the pipeline configuration). Unlike the real pipeline interface, the virtual pipeline interface performs the virtual pipeline configuration. To be specific, the correspondences between the to-be-rendered pipeline stage, the to-be-rendered resource position, and the to-be-rendered resource identifier of the to-be-rendered resource are obtained in response to the first pipeline configuration instruction. In this way, the virtual pipeline configuration information obtained by performing the virtual pipeline configuration through the virtual pipeline interface is structure information of the pipeline configuration, including the correspondences between the following three: the to-be-rendered pipeline stage, the to-be-rendered resource position, and the to-be-rendered resource identifier of the to-be-rendered resource. The to-be-rendered pipeline stage is a pipeline stage to be rendered, such as a geometry stage and a rasterization stage. The to-be-rendered resource is at least one rendering resource to be rendered. To be specific, the to-be-rendered resource is at least one rendering resource in current rendering, such as a texture, a map, and a model. The to-be-rendered resource position is a rendering position to which each rendering resource in the to-be-rendered resource corresponds during rendering. For example, the to-be-rendered resource of the geometry stage is 16 textures, and the to-be-rendered resource position is a rendering position to which each texture corresponds.

The first pipeline configuration instruction includes an action for instructing to perform the pipeline configuration, and further includes the to-be-rendered resource. In addition, content included in the first pipeline configuration instruction is fixed, which is determined by the rendering engine. According to this embodiment of this disclosure, in an asynchronous rendering scenario, the virtual pipeline interface is provided on the control device to respond to the first pipeline configuration instruction, to implement disassembling of the actions and the to-be-rendered resources. This provides feasibility for decreasing a data volume transmitted to the rendering device, as well as reuse of the rendering resources.

Operation 403: The control device transmits the virtual pipeline configuration information to the rendering device.

In this embodiment of this disclosure, because the rendering is performed by the rendering device, the control device transmits the virtual pipeline configuration information to the rendering device after obtaining the virtual pipeline configuration information, to enable the rendering device to perform rendering based on the virtual pipeline configuration information.

After operation 403 is performed, to be specific, after the control device transmits the virtual pipeline configuration information to the rendering device, the rendering device also receives the virtual pipeline configuration information transmitted by the control device. The virtual pipeline configuration information is obtained by the control device performing the virtual pipeline configuration in response to the first pipeline configuration instruction. The first pipeline configuration instruction is generated by the control device in response to the rendering trigger event, and the virtual pipeline configuration is implemented through the virtual pipeline interface.

A rendering process includes two processes of the pipeline configuration and performing rendering based on a pipeline configuration result. The pipeline configuration process is triggered by the pipeline configuration instruction, the process of performing rendering based on the pipeline configuration is triggered by a pipeline start instruction. In this way, after obtaining the first pipeline configuration instruction, the control device can further obtain the pipeline start instruction (such as a Draw instruction and a Dispatch instruction). Therefore, that the control device transmits the virtual pipeline configuration information to the rendering device in operation 403 includes: The control device transmits the virtual pipeline configuration information to the rendering device in response to the pipeline start instruction. In other words, the pipeline start instruction is a trigger instruction for the control device to synchronize the virtual pipeline configuration information to the rendering device. The control device only transmits the virtual pipeline configuration information to the rendering device after receiving the pipeline start instruction.

Operation 404: The rendering device generates a second pipeline configuration instruction based on the to-be-rendered pipeline stage, the to-be-rendered resource position, and a to-be-rendered resource corresponding to the to-be-rendered resource identifier.

In this embodiment of this disclosure, after obtaining the virtual pipeline configuration information, the rendering device restores a pipeline configuration instruction by parsing the virtual pipeline configuration information. The pipeline configuration instruction restored by the rendering device is referred to as the second pipeline configuration instruction. A process of restoring the pipeline configuration instruction by parsing the virtual pipeline configuration information includes: The rendering device first acquires the to-be-rendered resource corresponding to the to-be-rendered resource identifier in the virtual pipeline configuration information, and then generates the second pipeline configuration instruction based on the to-be-rendered pipeline stage and the to-be-rendered resource position in the virtual pipeline configuration information, and the obtained to-be-rendered resource.

The pipeline configuration instruction includes specified information and a structure corresponding to the specified information. The specified information includes the to-be-rendered pipeline stage, the to-be-rendered resource position, and the to-be-rendered resource. The second pipeline configuration instruction is obtained by combining the to-be-rendered pipeline stage, the to-be-rendered resource position, and the to-be-rendered resource based on the structure corresponding to the specified information. In addition, the second pipeline configuration instruction has the same function as the first pipeline configuration instruction, both are configured for performing pipeline configuration, a difference is that the first pipeline configuration instruction is generated by the control device in response to the rendering trigger event, and the second pipeline configuration instruction is generated by the rendering device by parsing the virtual pipeline configuration information.

Operation 405: The rendering device performs real pipeline configuration via a real rendering pipeline in response to the second pipeline configuration instruction, to obtain a real pipeline configuration result.

In this embodiment of this disclosure, the second pipeline configuration instruction is configured for triggering the rendering device to perform the pipeline configuration. In this way, after obtaining the second pipeline configuration instruction, the rendering device performs the pipeline configuration (also referred to as the real pipeline configuration) on the real rendering pipeline in response to the second pipeline configuration instruction. The rendering device performs the pipeline configuration on the real rendering pipeline, and an obtained result is the real pipeline configuration result.

The pipeline configuration of the rendering pipeline is performed on the rendering device, and the virtual pipeline configuration is performed on the control device for obtaining the virtual pipeline configuration information, to trigger the real pipeline configuration on the rendering device.

Operation 406: The rendering device performs rendering based on the real pipeline configuration result, to obtain a rendering result.

In this embodiment of this disclosure, the rendering device may perform the rendering processing based on the real pipeline configuration result after completing the pipeline configuration on the real rendering pipeline and obtaining the real pipeline configuration result, and when the rendering processing is completed, an obtained result is the rendering result. The rendering result may be rendering data for displaying a picture.

The control device obtains the virtual pipeline configuration information by performing the virtual pipeline configuration on the control device, and transmits the virtual pipeline configuration information to the rendering device, to enable the rendering device to generate the second pipeline configuration instruction based on the virtual pipeline configuration information, perform the real pipeline configuration through the real pipeline interface in response to the second pipeline configuration instruction, and perform rendering based on the real pipeline configuration result.

After the first pipeline configuration instruction for the to-be-rendered resource is obtained in response to the rendering trigger event, the virtual pipeline configuration information is first obtained through the virtual pipeline interface, the virtual pipeline configuration information is transmitted to the rendering device, the second pipeline configuration instruction is then restored on the rendering device by parsing the virtual pipeline configuration information, and the real pipeline configuration is performed through the real pipeline interface in response to the second pipeline configuration instruction, so that the rendering is performed based on the real pipeline configuration result. In this way, the rendering is implemented by the rendering device that is independent of a control device, and the virtual pipeline interface is constructed, so that the virtual pipeline configuration information is transmitted to the rendering device in response to the first pipeline configuration instruction. The virtual pipeline configuration information represents correspondences between a rendering pipeline stage, a resource rendering position, and a rendering resource identifier. This reduces a data transmission volume during an asynchronous rendering process, and can improve rendering efficiency.

FIG. 5 is a second schematic flowchart of a data processing method according to an embodiment of this disclosure. As shown in FIG. 5, operation 407 to operation 412 are further included before operation 404. In other words, in operation 404 in this embodiment of this disclosure, before the rendering device generates a second pipeline configuration instruction based on the to-be-rendered pipeline stage, the to-be-rendered resource position, and a to-be-rendered resource corresponding to the to-be-rendered resource identifier, the rendering resource-based data processing method further includes operation 407 to operation 412. The following describes each operation respectively.

Operation 407: The rendering device obtains, in a rendering resource library, a rendering resource based on the to-be-rendered resource identifier.

In this embodiment of this disclosure, when obtaining the to-be-rendered resource based on the to-be-rendered resource identifier, the rendering device first performs obtaining in the rendering resource library of the rendering device based on the to-be-rendered resource identifier. The rendering resource library includes the rendering resource in the rendering device that is obtained from the control device, and the rendering resource library includes all rendering resources sent to the rendering device by the control device up to a current moment.

Operation 408: The rendering device determines, when a rendering resource obtaining result indicates that the rendering resource library includes a rendering resource that matches the to-be-rendered resource identifier, the matched rendering resource as the to-be-rendered resource.

In this embodiment of this disclosure, the rendering device obtains, in the rendering resource library, the rendering resource based on the to-be-rendered resource identifier, and the obtained result is the rendering resource obtaining result. The rendering resource obtaining result may indicate that the rendering device obtains the rendering resource that matches the to-be-rendered resource identifier from the rendering resource library. In this case, the rendering resource that matches the to-be-rendered resource identifier and that the rendering device obtains from the rendering resource library is the to-be-rendered resource. In other words, the to-be-rendered resource is obtained from the rendering device at this time, and the to-be-rendered resource is sent by the control device to the rendering device up to the current moment. In this way, reuse of the rendering resource is achieved, and resource utilization is improved.

In the rendering resource library, each rendering resource corresponds to one resource identifier. The resource identifier uniquely identifies a rendering resource. In this way, the rendering device compares the to-be-rendered resource identifier with each resource identifier in the rendering resource library, to obtain at least one resource identifier consistent with the to-be-rendered resource identifier in the rendering resource library, and at least one rendering resource corresponding to the obtained at least one resource identifier is the at least one rendering resource that matches the to-be-rendered resource identifier. The to-be-rendered resource identifier includes at least one resource identifier.

Operation 409: The rendering device transmits, when the rendering resource obtaining result indicates that the rendering resource library does not include a rendering resource that matches the to-be-rendered resource identifier, a rendering resource request carrying the to-be-rendered resource identifier to the control device.

In this embodiment of this disclosure, the rendering resource obtaining result may also indicate that the rendering device does not obtain the rendering resource that matches the to-be-rendered resource identifier from the rendering resource library. In other words, the rendering resource library does not include the rendering resource that matches the to-be-rendered resource identifier. In this case, the rendering device transmits the rendering resource request carrying the to-be-rendered resource identifier to the control device, to request the to-be-rendered resource from the control device. Therefore, the to-be-rendered resource is obtained by the rendering device from the control device. The rendering resource request is configured for requesting the to-be-rendered resource that matches the to-be-rendered resource identifier from the control device.

Operation 410: The control device obtains, in response to the rendering resource request from a rendering resource set, at least one rendering resource corresponding to the to-be-rendered resource identifier, and determines the at least one rendering resource as the to-be-rendered resource.

In this embodiment of this disclosure, after operation 409 is performed, to be specific, after the rendering device transmits the rendering resource request carrying the to-be-rendered resource identifier to the control device, the control device also receives the rendering resource request transmitted by the rendering device, and the rendering resource request indicates that the rendering device does not include the to-be-rendered resource corresponding to the to-be-rendered resource identifier. Because the rendering resource request carries the to-be-rendered resource identifier, in this case, the control device obtains, in response to the rendering resource request, the to-be-rendered resource corresponding to the to-be-rendered resource identifier in the rendering resource set of the control device. The to-be-rendered resource is the at least one rendering resource corresponding to the to-be-rendered resource identifier in the rendering resource set.

Operation 410 is performed after operation 403. To be specific, after the control device transmits the virtual pipeline configuration information to the rendering device, operation 410 is performed. The rendering resource set includes various rendering resources, which are all rendering resources to be used at an entire rendering stage (such as a game and an animation scene).

Operation 411: The control device transmits the to-be-rendered resource to the rendering device.

In this embodiment of this disclosure, after obtaining the to-be-rendered resource in response to the rendering resource request, the control device transmits the to-be-rendered resource to the rendering device, to respond to the rendering resource request. The control device transmits the to-be-rendered resource to the rendering device, to enable the rendering device to parse the virtual pipeline configuration information based on the to-be-rendered resource to obtain the second pipeline configuration instruction.

After operation 411 is performed, to be specific, after the control device transmits the to-be-rendered resource to the rendering device, the rendering device also receives the to-be-rendered resource sent by the control device for the rendering resource request.

Operation 412: The rendering device updates the to-be-rendered resource into the rendering resource library.

In this embodiment of this disclosure, because the to-be-rendered resource is not included in the rendering resource library of the rendering device, the rendering device obtains the to-be-rendered resource from the control device Therefore, after obtaining the to-be-rendered resource from the control device, the rendering device updates the to-be-rendered resource into the rendering resource library for obtaining a rendering resource next time based on the updated rendering resource library, to achieve reuse of the to-be-rendered resource.

The to-be-rendered resource may be obtained by the rendering device from the rendering device, or may be obtained by the rendering device from the control device, or may be a combination thereof. When the to-be-rendered resource is obtained by the rendering device from the rendering device, it indicates that the rendering resource library of the rendering device itself includes the to-be-rendered resource. When the to-be-rendered resource is obtained by the rendering device from the rendering resource library of the rendering device and from the control device, it indicates that the rendering resource library of the rendering device itself includes a part of rendering resource of the to-be-rendered resource.

In this embodiment of this disclosure, before a control device generates a first pipeline configuration instruction for a to-be-rendered resource in response to a rendering trigger event in operation 401, the rendering resource-based data processing method further includes: The control device transmits the rendering resource set to the rendering device, to enable the rendering device to parse the virtual pipeline configuration information based on the rendering resource set to obtain the second pipeline configuration instruction. In this way, before the rendering device receives the virtual pipeline configuration information transmitted by the control device, the rendering resource-based data processing method further includes: The rendering device receives the rendering resource set transmitted by the control device.

Accordingly, in this embodiment of this disclosure, that a control device generates a first pipeline configuration instruction for a to-be-rendered resource in response to a rendering trigger event in operation 401 includes: The control device generates, when the rendering resource set is transmitted successfully or during the transmission, the first pipeline configuration instruction for the to-be-rendered resource in response to the rendering trigger event. In addition, before the rendering device generates a second pipeline configuration instruction based on the to-be-rendered pipeline stage, the to-be-rendered resource position, and a to-be-rendered resource corresponding to the to-be-rendered resource identifier in operation 404, the rendering resource-based data processing method further includes: The rendering device obtains, from the rendering resource set, the at least one rendering resource corresponding to the to-be-rendered resource identifier, and determines the at least one rendering resource as the to-be-rendered resource.

The control device may transmit the rendering resource set in the entire rendering stage to the rendering device at one time at a rendering preparation stage, to obtain, during parsing of the rendering device, the to-be-rendered resource directly from the rendering resource set transmitted by the control device. This reduces time consumption of obtaining the rendering resource from the control device during rendering, and can improve rendering efficiency.

In this embodiment of this disclosure, the rendering resource-based data processing method further includes a process in which the rendering device returns rendering data to the control device. The return of the rendering data is triggered when the control device performs data calculation based on the rendering data. The process of returning the rendering data includes: The control device determines a rendering data identifier associated with the data calculation during performing the virtual pipeline configuration in response to the rendering trigger event. The control device transmits a rendering data request carrying the rendering data identifier to the rendering device, to enable the rendering device to obtain target rendering data from a rendering result based on the rendering data identifier. The control device receives the target rendering data transmitted by the rendering device in response to the rendering data request. In this way, the control device performs the data calculation based on the target rendering data.

After the control device transmits the rendering data request to the rendering device, the rendering device also receives the rendering data request transmitted by the control device. The rendering data request carries the rendering data identifier associated with the data calculation performed by the control device, the rendering data identifier is configured for determining rendering data associated with the data calculation, and the rendering data associated with the data calculation is the target rendering data. In this way, the rendering device obtains, from the rendering result in response to the rendering data request, the target rendering data corresponding to the rendering data identifier. The target rendering data is transmitted to the control device, to enable the control device to perform data calculation based on the target rendering data.

Because there is a case that data processing is performed based on the rendering data when the control device performs data processing by running a client, the rendering device can implement an application function of the running client by transmitting related rendering data to the control device. For example, in a case that the control device calculates buoyancy of a virtual object based on water surface fluctuation data, the buoyancy may be calculated by obtaining the water surface fluctuation data from the rendering device. The water surface fluctuation data is the returned rendering data.

FIG. 6 is a third schematic flowchart of a data processing method according to an embodiment of this disclosure. As shown in FIG. 6, operation 413 and operation 414 are further included after operation 403. In other words, after the control device transmits the virtual pipeline configuration information to the rendering device, the rendering resource-based data processing method further includes operation 413 and operation 414. The following describes each operation respectively.

Operation 413: The control device receives rendered video information transmitted by the rendering device for the virtual pipeline configuration information.

The rendered video information is generated by the rendering device based on the rendering result and is video data to be played, for example, video data for displaying a virtual scene picture and video data for displaying an animation.

Operation 414: The control device plays the rendered video information.

After obtaining the rendered video information transmitted by the rendering device, the control device plays the rendered video information, to display a corresponding video picture, such as a virtual scene picture and an animation picture.

In this embodiment of this disclosure, after obtaining the rendering result, the rendering device may display a video picture based on the rendering result in an off-screen manner, or may display the video picture based on the rendering result in the rendering device by using a virtual rendering application module (such as a virtual game process), or may display in a combination thereof, or the like. This is not limited in this embodiment of this disclosure.

Because the rendering is implemented by the rendering device independent of the control device, the data calculation is implemented by the control device, the rendering is implemented by a graphics processing unit (GPU) of the rendering device, and the data calculation is implemented by a central processing unit of the control device, pooling of the central processing unit and the graphics processing unit can further be implemented in this embodiment of this disclosure by performing the data calculation and the rendering asynchronously. In this way, both the central processing unit and the graphics processing unit can be co-located. In other words, each central processing unit exists in a central processing unit pool with its own computing power, so that a central processing unit having a computing power lower than a specified computing power due to a usage duration longer than a specified duration can still be a central processing unit having a lower computing power in the central processing unit pool. In addition, each graphics processing unit exists in a graphics processing unit pool with its own computing power, so that a graphics processing unit having a computing power lower than a specified computing power due to a usage duration longer than a specified duration can still be a graphics processing unit having a lower computing power in the graphics processing unit pool. In this way, resource utilization is improved.

The data calculation means processing other than rendering performed by the control device during an application process of the client, such as calculation of a state value of a virtual object and buoyancy calculation of a virtual object on a virtual sea surface.

In this embodiment of this disclosure, the rendering resource-based data processing method further includes: The control device obtains first computing power of each central processing unit in the control device, and determines first total computing power based on the first computing power. When the first total computing power is lower than a first computing power threshold, first update prompt information corresponding to the central processing unit is generated. The first update prompt information is configured for prompting that computing power of the central processing unit needs to be increased. The first update prompt information may be voice information, a message to be sent, displayed information, a combination thereof, or the like. Similarly, the rendering device obtains second computing power of each graphics processing unit in the rendering device, and determines second total computing power based on the second computing power. When the second total computing power is lower than a second computing power threshold, second update prompt information corresponding to the graphics processing unit is generated. The second update prompt information is configured for prompting that computing power of the graphics processing unit needs to be increased. The second update prompt information may be voice information, a message to be sent, displayed information, a combination thereof, or the like.

In this embodiment of this disclosure, during increasing the computing power of the central processing unit and the graphics processing unit, the central processing unit and the graphics processing unit are independent, which solves a resource consumption problem on a device caused by a fixed quantity ratio of the central processing unit and the graphics processing unit, and reduces resource consumption during a resource update process.

In this embodiment of this disclosure, the rendering device may be a device cluster including various graphics processing units for performing different rendering tasks, to implement reuse of the rendering device and improve resource efficiency. In this way, after the rendering device performs rendering based on the real pipeline configuration result, to obtain a rendering result in operation 406 in this embodiment of this disclosure, the rendering resource-based data processing method further includes: The rendering device obtains a device resource occupancy ratio of the rendering device (such as memory usage and CPU usage). When the device resource occupancy ratio is lower than a specified device resource occupancy ratio, it indicates that the current rendering device is also available to perform another rendering processing. In this way, the rendering device detects a rendering request. When a to-be-rendered request is detected, target rendering corresponding to the to-be-rendered request is performed in response to the to-be-rendered request.

In this embodiment of this disclosure, the virtual pipeline interface includes a plurality of sub virtual pipeline interfaces. In this way, that the control device performs virtual pipeline configuration through a virtual pipeline interface in response to the first pipeline configuration instruction, to obtain virtual pipeline configuration information in operation 402 includes: The control device performs virtual pipeline configuration through each sub virtual pipeline interface in response to the first pipeline configuration instruction, to obtain sub virtual pipeline configuration information, and obtain a plurality of pieces of sub virtual pipeline configuration information corresponding to the virtual pipeline interface. The plurality of pieces of sub virtual pipeline configuration information are serialized, to obtain the virtual pipeline configuration information. Different sub virtual pipeline interfaces are configured to implement different virtual pipeline configuration. Serialization means a process of converting data into data in a to-be-transmitted format.

Because the virtual pipeline interface includes a plurality of sub virtual pipeline interfaces, and the plurality of sub virtual pipeline interface are configured to implement different virtual pipeline configuration, the virtual pipeline configuration is diverse to respond to different rendering instructions, to improve comprehensiveness of the virtual pipeline configuration for the rendering instructions.

Exemplary application of this embodiment of this disclosure in an actual application scenario is described below. The exemplary application describes a process for cloud rendering in a game scene by synchronizing pipeline configuration information. The cloud rendering means a process of performing rendering in a remote cloud server. A terminal sends a service instruction of a game to the cloud server, so that the cloud server performs a corresponding rendering task based on the service instruction. In addition, when performing the rendering task, the cloud server sends virtual pipeline configuration information to another server by providing a virtual pipeline interface in the cloud server, to perform rendering on the another server based on the virtual pipeline configuration information. During the cloud rendering, the foregoing control device includes the terminal and the cloud server, and the rendering device is the another server. During the cloud rendering of the game, the client is a game client.

Figure 7:
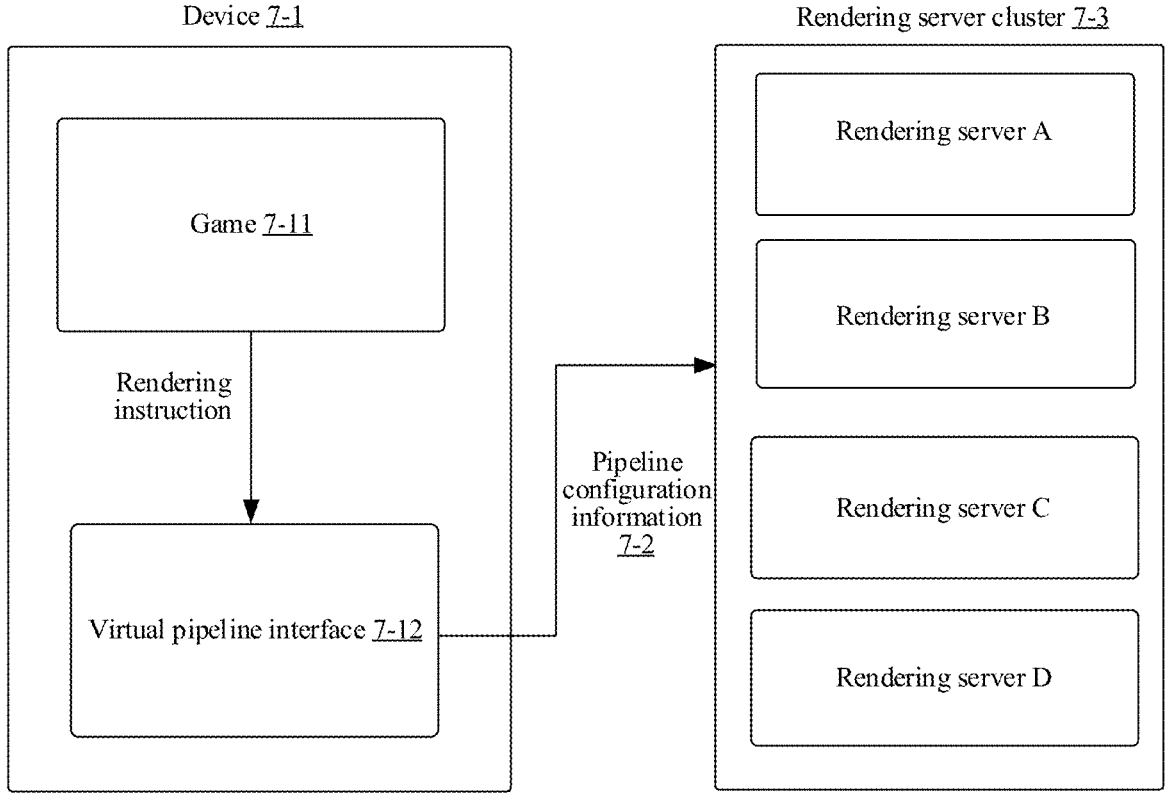
FIG. 7 is a schematic diagram of an exemplary cloud rendering architecture according to an embodiment of this disclosure.

FIG. 7 is a schematic diagram of an exemplary cloud rendering architecture according to an embodiment of this disclosure. As shown in FIG. 7, when a game 7-11 is started on a device 7-1, a rendering instruction (referred to as a first pipeline configuration instruction) is obtained. The rendering instruction is configured for calling a plurality of application programming interfaces (APIs) in a multimedia programming interface (such as DirectX and OpenGL) to implement resource creation and pipeline configuration. In this way, the plurality of called APIs include a resource creation API for implementing the resource creation, and a pipeline configuration API (referred to as a pipeline interface) for implementing the pipeline configuration. The resource creation API is configured to convert compressed or packaged rendering resource stored in a file from a storage format to a pipeline format used by a rendering pipeline, and a created rendering resource is obtained. The resource creation is performed before rendering. The pipeline configuration API is configured to perform the pipeline configuration based on the created rendering resource, to perform rendering based on a pipeline configuration result after the pipeline configuration is completed.

The exemplary cloud rendering architecture includes the device 7-1 and a rendering server cluster 7-3 (also referred to as another server), and the device 7-1 includes a terminal and a cloud server. The terminal is configured to receive an operation (such as a user operation and an operation triggered by an intelligent agent) and send a service instruction to the cloud server in response to the received operation. The cloud server is configured to determine, based on the service instruction, that a rendering trigger event is received, perform virtual pipeline configuration through a virtual pipeline interface in response to the rendering trigger event, to obtain virtual pipeline configuration information, and transmits the virtual pipeline configuration information to the rendering server cluster 7-3. The rendering server cluster 7-3 is configured to perform rendering based on the virtual configuration information, and transmit rendered video information to a cloud server of the device 7-1. The cloud server forwards the video information to the terminal, and the video information is played on the terminal.

Still refer to FIG. 7. The device 7-1 includes a virtual pipeline interface 7-12. The virtual pipeline interface 7-12 is constructed based on the pipeline configuration interface in the multimedia programming interface, is same as the pipeline configuration interface in the multimedia programming interface, and is a module that executes the pipeline configuration instruction. In addition, the virtual pipeline interface 7-12 is configured to generate pipeline configuration information (referred to as the virtual pipeline configuration information) based on the received pipeline configuration instruction. The device 7-1 acts on the virtual pipeline interface 7-12 when calling the pipeline configuration API, and pipeline configuration information 7-2 (referred to as the virtual pipeline configuration information) is generated through the virtual pipeline interface 7-12 in response to the call on the pipeline configuration API. The pipeline configuration information 7-2 includes structure information of a pipeline stage (referred to as a to-be-rendered pipeline stage), a resource position (referred to as a to-be-rendered resource position), and a rendering resource hash value (referred to as a to-be-rendered resource identifier). The device 7-1 synchronizes the pipeline configuration information 7-2 to the rendering server cluster 7-3 (for example, a rendering server A, a rendering server B, a rendering server C, and a rendering server D are shown, referred to as rendering devices). The rendering server cluster 7-3 parses the received pipeline configuration information 7-2, to convert the received pipeline configuration information 7-2 to a call instruction (referred to as a second pipeline configuration instruction) to a real rendering pipeline, performs pipeline configuration (referred to as real pipeline configuration) again on the real rendering pipeline based on the converted call instruction, and finally performs rendering based on a pipeline configuration result (referred to as a real pipeline configuration result).

Figure 8:
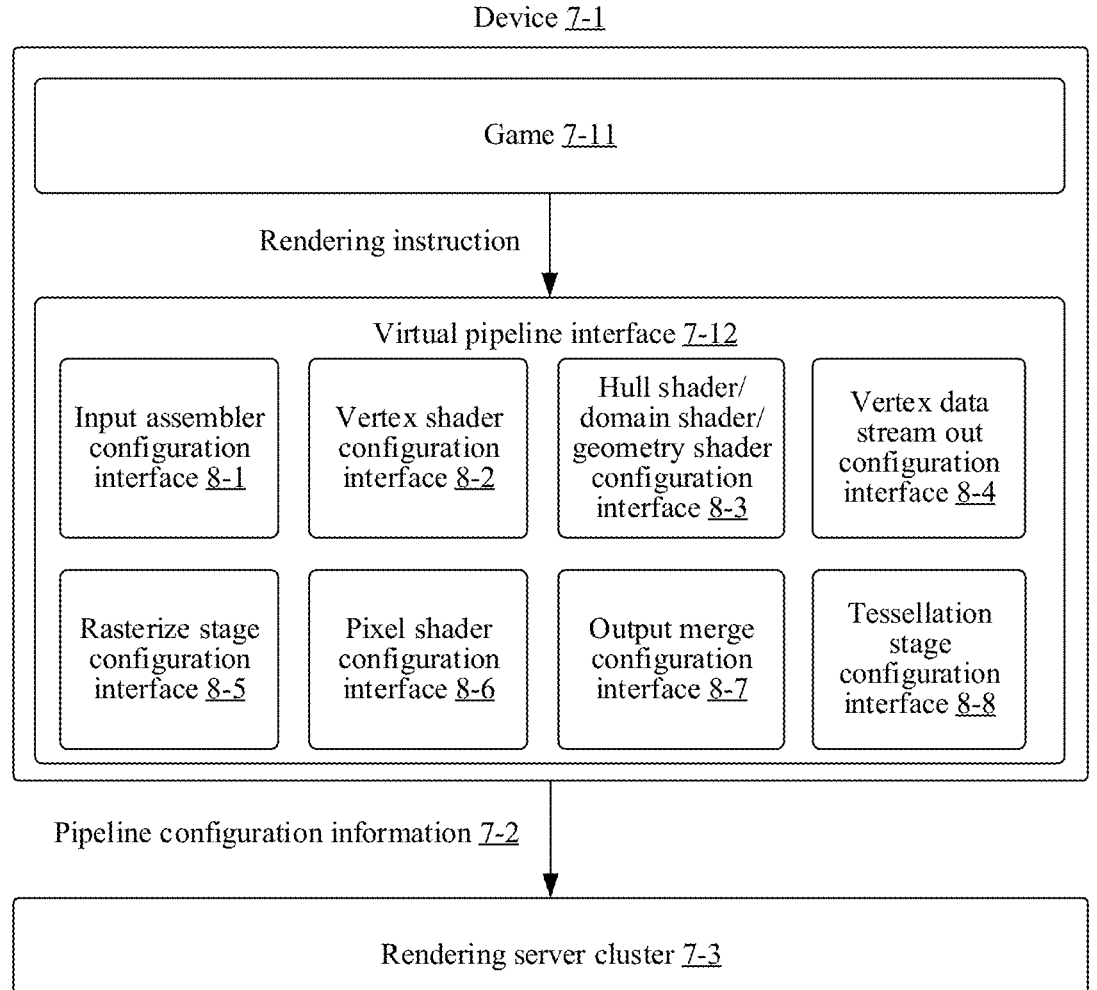
FIG. 8 is a schematic diagram of a structure of an exemplary virtual pipeline interface according to an embodiment of this disclosure.

The virtual pipeline interface 7-12 in the device 7-1 is described in detail below. Based on FIG. 7, FIG. 8 is a schematic diagram of a structure of an exemplary virtual pipeline interface according to an embodiment of this disclosure. As shown in FIG. 8, the virtual pipeline interface 7-12 includes an input assembler (IA) configuration interface 8-1, a vertex shader (VS) configuration interface 8-2, a hull shader (HS)/domain shader (DS)/geometry shader (GS) configuration interface 8-3, a vertex data stream out (SO) configuration interface 8-4, a rasterize stage (RS) configuration interface 8-5, a pixel shader (PS) configuration interface 8-6, an output merge (OM) configuration interface 8-7, and a tessellation stage (TS) configuration interface 8-8 (referred to as a plurality of sub virtual pipeline interfaces). The virtual pipeline interface 7-12 generates, in response to the call instruction of the pipeline configuration interface, eight pieces of configuration structure information (referred to as a plurality of pieces of sub virtual pipeline configuration information) based on the eight configuration interfaces (8-1 to 8-8) in the virtual pipeline interface 7-12, and serializes the eight pieces of configuration structure information, so that the pipeline configuration information 7-2 is obtained.

Figure 9:
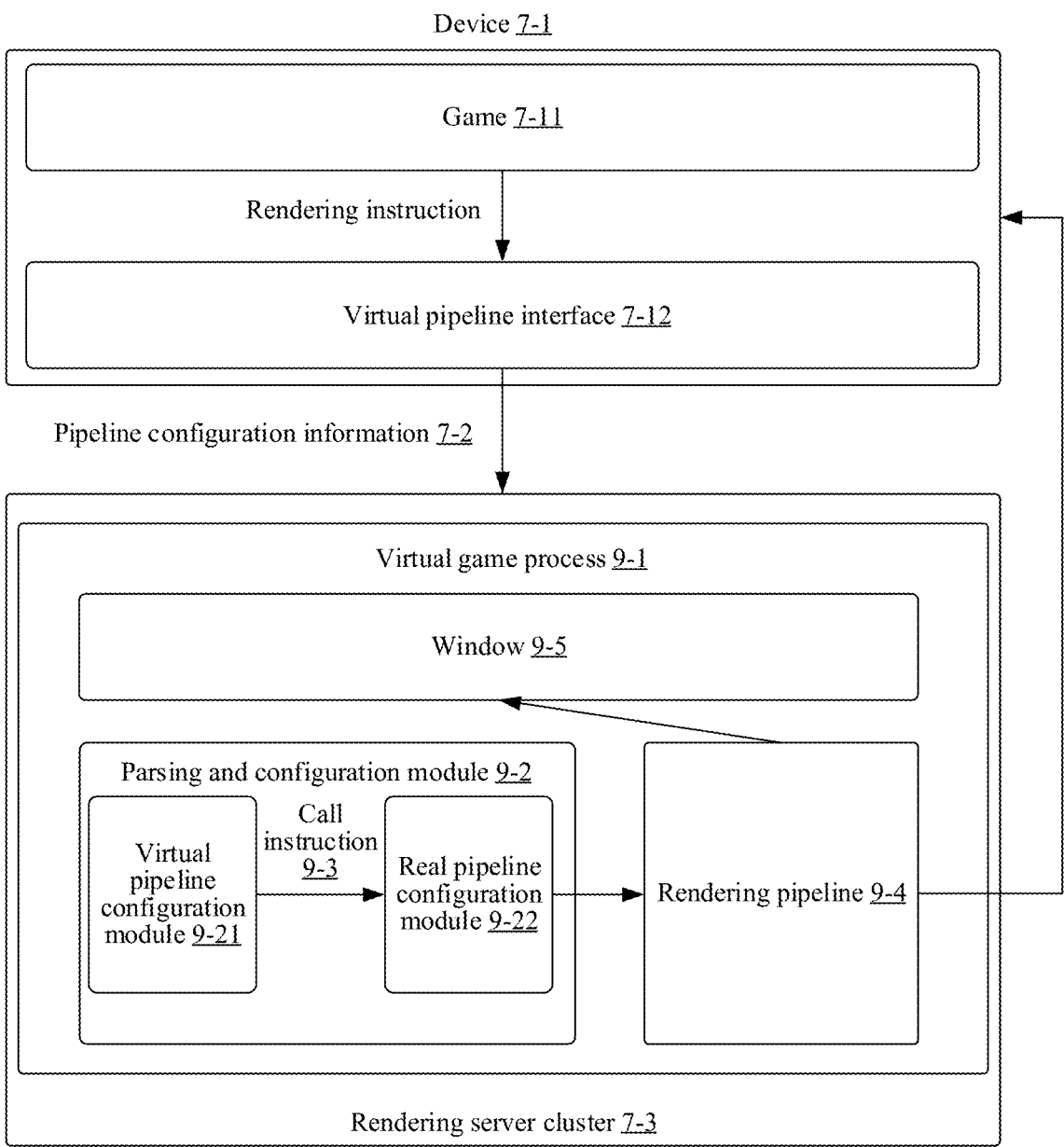
FIG. 9 is a schematic diagram of a structure of an exemplary rendering server cluster according to an embodiment of this disclosure.

The rendering server cluster 7-3 is described in detail below. Based on FIG. 7, FIG. 9 is a schematic diagram of a structure of an exemplary rendering server cluster according to an embodiment of this disclosure. As shown in FIG. 9, the rendering server cluster 7-3 includes a virtual game process 9-1 for receiving the pipeline configuration information 7-2 synchronized by the device 7-1 and calling a virtual pipeline configuration module 9-21 in a parsing and configuration module 9-2 to deserialize the pipeline configuration information 7-2, to restore a call instruction 9-3 (referred to as the second pipeline configuration instruction) of the pipeline configuration interface. Next, the virtual game process 9-1 calls a real pipeline configuration module 9-22 (referred to as the real pipeline configuration interface) in the parsing and configuration module 9-2 based on the call instruction 9-3, to perform real pipeline configuration on a rendering pipeline 9-4. Finally, rendering is performed based on the real pipeline configuration result to display a rendered game picture in a window 9-5, or the rendering result is sent to the device 7-1 for off-screen rendering.

The rendered game picture is displayed in the window 9-5, so that debugging efficiency can be improved and debugging complexity can be simplified.

Figures 10, 11:
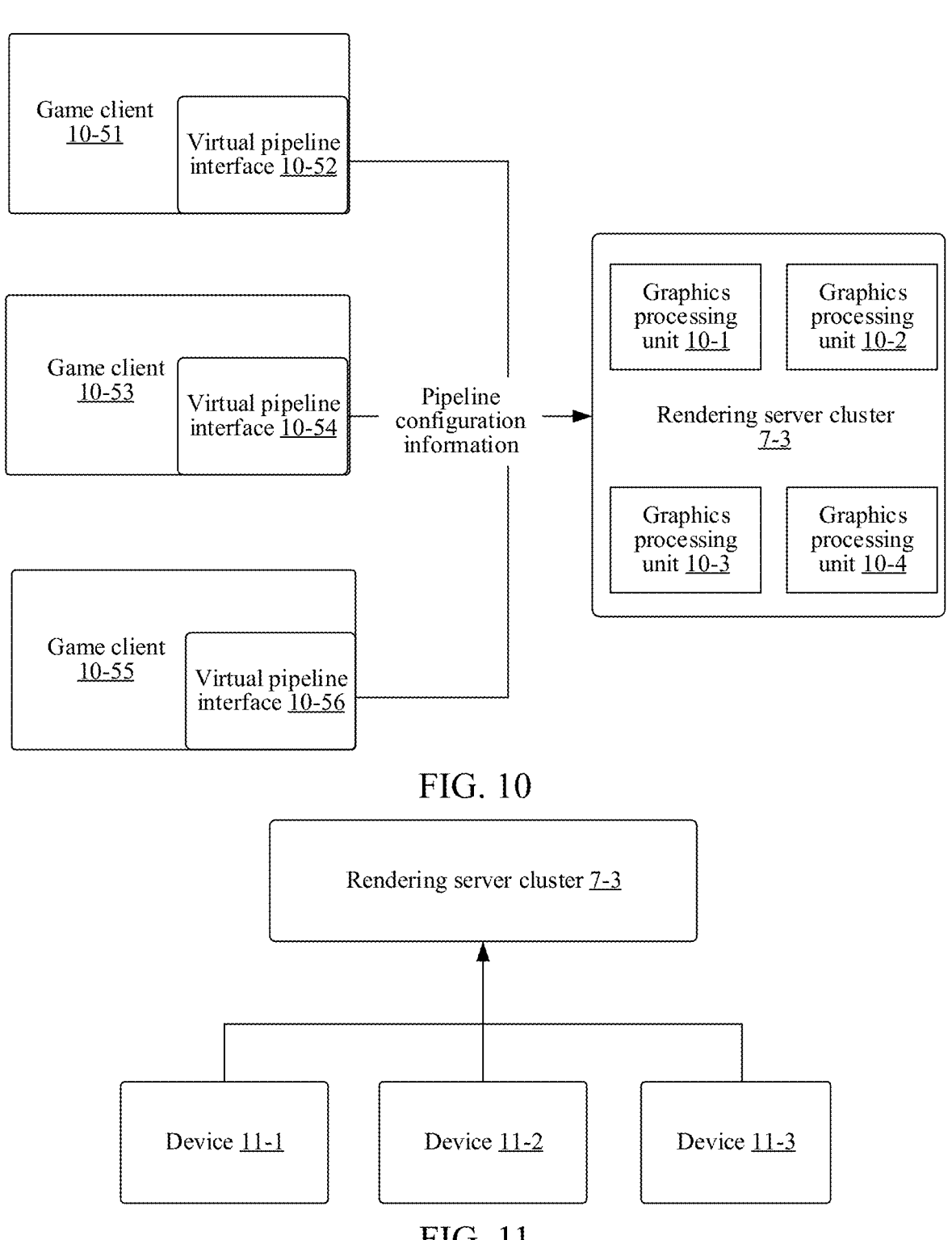
FIG. 10 is a schematic diagram of an exemplary co-located rendering server cluster according to an embodiment of this disclosure.
FIG. 11 is a schematic diagram of an exemplary game rendering architecture according to an embodiment of this disclosure.

In this embodiment of this disclosure, the rendering server cluster 7-3 may be implemented in a manner of co-locating rendering hardware. Based on FIG. 7, FIG. 10 is a schematic diagram of an exemplary co-located rendering server cluster according to an embodiment of this disclosure. As shown in FIG. 10, the rendering server cluster 7-3 includes a graphics processing unit 10-1, a graphics processing unit 10-2, a graphics processing unit 10-3, and a graphics processing unit 10-4. In this way, the rendering server cluster 7-3 may provide rendering services for different game clients, such as receiving pipeline configuration information sent through a virtual pipeline interface 10-52 of a game client 10-51 to render a game picture for the game client 10-51; receiving pipeline configuration information sent through a virtual pipeline interface 10-54 of a game client 10-53 to render a game picture for the game client 10-53; and receiving pipeline configuration information sent through a virtual pipeline interface 10-56 of a game client 10-55 to render a game picture for the game client 10-55.

In this embodiment of this disclosure, the rendering process is performed on the rendering server cluster, so that the game client can be used on a device without a graphics processing unit, and running complexity of the game client is simplified and a rendering application range is expanded. Based on FIG. 7, FIG. 11 is a schematic diagram of an exemplary game rendering architecture according to an embodiment of this disclosure. As shown in FIG. 11, the rendering server cluster 7-3 may provide rendering services for a plurality of devices (for example, a device 11-1 to a device 11-3 are shown) without a graphics processing units.

When the device 7-1 (such as a game client) performs calculation, the virtual pipeline interface 7-12 can determine an associated rendering data identifier, and pull corresponding rendering data (referred to as target rendering data) from the rendering server cluster 7-3 based on the associated rendering data identifier. Because all rendering data in the rendering pipeline can be obtained through an API of DirectX, and all the rendering data in the rendering pipeline is copied into a CPU memory of the rendering server, when performing the calculation based on the rendering data, the game client requests the rendering data from the virtual game process on the rendering server cluster 7-3, and transmits the obtained rendering data to a CPU of a device running the game client.

In one aspect, the pipeline configuration information is synchronized to the rendering server cluster for rendering on the rendering server cluster, so that CPU calculation and GPU rendering are separated. In this way, duration to wait for GPU rendering to finish before performing CPU calculations is shortened, and rendering efficiency is improved. In addition, CPU calculation and GPU rendering are performed asynchronously on different devices. This can increase a frame rate and improve smoothness of picture display. In another aspect, in a cloud gaming application scenario, a calculation server cluster and a rendering server cluster are separated, so that a resource consumption problem on the same device caused by a fixed ratio of the CPU and the GPU can be solved, hardware with different computing power is uniformly scheduled and calculated in a cluster, and resource utilization is improved. In still another aspect, the rendering is implemented by the rendering server cluster, so that rendering of a game picture can be implemented, and another rendering processing such as rendering of an animation picture can be implemented. In this way, reuse of the GPU can be implemented, and the resource utilization can be improved.

The following continues to describe an exemplary structure in which a first data processing apparatus 355 provided in this embodiment of this disclosure is implemented as a software module. In some embodiments, as shown in FIG. 2, the software module stored in the first data processing apparatus 355 of the first memory 350 may include:

a rendering trigger module 3551, configured to generate a first pipeline configuration instruction for a to-be-rendered resource in response to a rendering trigger event;

a virtual configuration module 3552, configured to perform virtual pipeline configuration through a virtual pipeline interface in response to the first pipeline configuration instruction, to obtain virtual pipeline configuration information, the virtual pipeline configuration information representing correspondences between the following three pieces of information: a to-be-rendered pipeline stage, a to-be-rendered resource position, and a to-be-rendered resource identifier of the to-be-rendered resource; and an information synchronization module 3553, configured to transmit the virtual pipeline configuration information to a rendering device, the rendering device being configured to generate a second pipeline configuration instruction based on the virtual pipeline configuration information, perform real pipeline configuration through a real pipeline interface in response to the second pipeline configuration instruction, and perform rendering based on a real pipeline configuration result.

In this embodiment of this disclosure, the first data processing apparatus 355 further includes a resource transmission module 3554, configured to: receive a rendering resource request transmitted by the rendering device, the rendering resource request carrying the to-be-rendered resource identifier; obtain, in response to the rendering resource request from a rendering resource set, at least one rendering resource corresponding to the to-be-rendered resource identifier, and determine the at least one rendering resource as the to-be-rendered resource, the rendering resource set including various rendering resources; and transmit the to-be-rendered resource to the rendering device, the rendering device being configured to parse the virtual pipeline configuration information based on the to-be-rendered resource.

In this embodiment of this disclosure, the resource transmission module 3554 is further configured to transmit a rendering resource set to the rendering device, the rendering device being configured to parse the virtual pipeline configuration information based on the rendering resource set.

In this embodiment of this disclosure, the rendering trigger module 3551 is further configured to generate, when the rendering resource set is transmitted successfully, the first pipeline configuration instruction for the to-be-rendered resource in response to the rendering trigger event.

In this embodiment of this disclosure, the first data processing apparatus 355 further includes a data request module 3555, configured to: determine a rendering data identifier associated with data calculation during performing the virtual pipeline configuration in response to the rendering trigger event; transmit a rendering data request carrying the rendering data identifier to the rendering device, the rendering device being configured to obtain target rendering data from a rendering result based on the rendering data identifier; receive the target rendering data transmitted by the rendering device in response to the rendering data request; and perform data calculation based on the target rendering data.

In this embodiment of this disclosure, the first data processing apparatus 355 further includes a picture display module 3556, configured to: receive rendered video information transmitted by the rendering device for the virtual pipeline configuration information, the rendered video information being generated by the rendering device based on a rendering result; and play the rendered video information.

In this embodiment of this disclosure, the first data processing apparatus 355 further includes a device update module 3557, configured to: obtain first computing power of each central processing unit in the control device, and determine first total computing power based on the first computing power; and generate, when the first total computing power is lower than a first computing power threshold, first update prompt information corresponding to the central processing unit, the first update prompt information being configured for prompting that computing power of the central processing unit needs to be increased.

The following continues to describe an exemplary structure in which a second data processing apparatus 255 provided in this embodiment of this disclosure is implemented as a software module. In some embodiments, as shown in FIG. 3, the software module stored in the second data processing apparatus 255 of the second memory 250 may include:

an information receiving module 2551, configured to receive virtual pipeline configuration information transmitted by a control device, the virtual pipeline configuration information being obtained by the control device performing virtual pipeline configuration in response to a first pipeline configuration instruction, the first pipeline configuration instruction being generated by the control device in response to a rendering trigger event, the virtual pipeline configuration being implemented through a virtual pipeline interface, and the virtual pipeline configuration information representing correspondences between the following three pieces of information: a to-be-rendered pipeline stage, a to-be-rendered resource position, and a to-be-rendered resource identifier;

an instruction restoration module 2552, configured to generate a second pipeline configuration instruction based on the to-be-rendered pipeline stage, the to-be-rendered resource position, and a to-be-rendered resource corresponding to the to-be-rendered resource identifier;

a pipeline configuration module 2553, configured to perform real pipeline configuration via a real rendering pipeline in response to the second pipeline configuration instruction, to obtain a real pipeline configuration result; and an information rendering module 2554, configured to perform rendering based on the real pipeline configuration result, to obtain a rendering result.

In this embodiment of this disclosure, the instruction restoration module 2552 is further configured to: obtain, in a rendering resource library, a rendering resource based on the to-be-rendered resource identifier, the rendering resource library including a rendering resource in the rendering device that is obtained from the control device; determine, when a rendering resource obtaining result indicates that the rendering resource library includes at least one rendering resource that matches the to-be-rendered resource identifier, the at least one matched rendering resource as the to-be-rendered resource; or transmit, when a rendering resource obtaining result indicates that the rendering resource library does not include a rendering resource that matches the to-be-rendered resource identifier, a rendering resource request carrying the to-be-rendered resource identifier to the control device, receive the to-be-rendered resource transmitted by the control device for the rendering resource request, and update the to-be-rendered resource into the rendering resource library.

In this embodiment of this disclosure, the instruction restoration module 2552 is further configured to: receive a rendering resource set transmitted by the control device, the rendering resource set including various rendering resources; and obtain, from the rendering resource set, at least one rendering resource corresponding to the to-be-rendered resource identifier, and determine the at least one rendering resource as the to-be-rendered resource.

In this embodiment of this disclosure, the second data processing apparatus 255 further includes a data return module 2555, configured to: receive a rendering data request transmitted by the control device, the rendering data request carrying a rendering data identifier associated with data calculation performed by the control device; obtain, from the rendering result in response to the rendering data request, target rendering data corresponding to the rendering data identifier; and transmit the target rendering data to the control device, the control device being configured to perform data calculation based on the target rendering data.

In this embodiment of this disclosure, the information rendering module 2554 is further configured to: obtain a device resource occupancy ratio of the rendering device; detect a rendering request when the device resource occupancy ratio is lower than a specified device resource occupancy ratio; and perform, when a to-be-rendered request is detected and in response to the to-be-rendered request, rendering corresponding to the to-be-rendered request.

In this embodiment of this disclosure, the information rendering module 2554 is further configured to: obtain second computing power of each graphics processing unit in the rendering device, and determine second total computing power based on the second computing power; and generate, when the second total computing power is lower than a second computing power threshold, second update prompt information corresponding to the graphics processing unit, the second update prompt information being configured for prompting that computing power of the graphics processing unit needs to be increased.

An embodiment of this disclosure provides a computer program product. The computer program product includes a computer program or computer-executable instructions. The computer program or the computer-executable instructions are stored in a computer-readable storage medium. A first processor (also referred to as first processing circuitry) of a control device reads the computer program or the computer-executable instructions from the computer-readable storage medium. The first processor executes the computer program or the computer-executable instructions, to enable the control device to perform the data processing method applied to the control device described in embodiments of this disclosure. Alternatively, a second processor (also referred to as second processing circuitry) of a rendering device reads the computer program or the computer-executable instructions from the computer-readable storage medium. The second processor executes the computer program or the computer-executable instructions, to enable the rendering device to perform the data processing method applied to the rendering device described in embodiments of this disclosure.

An embodiment of this disclosure provides a non-transitory computer-readable storage medium, having a computer program or computer-executable instructions stored thereon. When the computer program or the computer-executable instructions are executed by a first processor, the first processor is enabled to perform the data processing method applied to a control device provided in embodiments of this disclosure. Alternatively, when the computer program or the computer-executable instructions are executed by a second processor, the second processor is enabled to perform the data processing method applied to a rendering device provided in embodiments of this disclosure, for example, the rendering resource-based data processing method shown in FIG. 4.

In some embodiments, the non-transitory computer-readable storage medium may be a memory such as a ferroelectric random-access memory (FRAM), a read-only memory (ROM), a programmable ROM (PROM), an electrically programmable ROM (EPROM), an electrically erasable programmable ROM (EEPROM), a flash memory, a magnetic memory, a compact disc, or a compact disc ROM (CD-ROM); and may alternatively be various devices including one of the foregoing memories or any combination thereof.

In some embodiments, the computer-executable instructions may be written in the form of program, software, software module, script, or code in any form of programming language (including compilation or interpretation language, or declarative or procedural language), and the computer executable instructions may be deployed in any form, including being deployed as an independent program or being deployed as a module, component, subroutine, or another unit suitable for use in a computing environment.

As an example, the computer-executable instructions may, but do not necessarily, correspond to files in a file system, and may be stored in a part of the file for saving other programs or data, for example, stored in one or more scripts in a hyper text markup language (HTML) document, in a single file specifically used for the program of interest, or in a plurality of collaborative files (for example, files storing one or more modules, a submodule, or a code part).

As an example, the computer-executable instructions may be deployed to be executed on a plurality of electronic devices located in a single location (in this case, the plurality of electronic devices located in a single location are the control device and the rendering device), or deployed on a plurality of electronic devices distributed in a plurality of locations and interconnected via a communication network (in this case, the plurality of electronic devices distributed in a plurality of locations and interconnected via a communication network are the control device and the rendering device).

In embodiments of this disclosure, data related to operations, rendering resources, and the like is involved. When embodiments of this disclosure are applied to specific products or technologies, user permission or consent needs to be obtained, and collection, use, and processing of related data need to comply with relevant laws, regulations and standards of relevant countries and regions.

In conclusion, in embodiments of this disclosure, after a first pipeline configuration instruction for a to-be-rendered resource is obtained in response to a rendering trigger event, virtual pipeline configuration information is first obtained through a virtual pipeline interface, the virtual pipeline configuration information is transmitted to a rendering device, a second pipeline configuration instruction is then restored on the rendering device by parsing the virtual pipeline configuration information, and real pipeline configuration is performed through a real pipeline interface in response to the second pipeline configuration instruction, so that rendering is performed based on a real pipeline configuration result. In this way, the rendering is implemented by the rendering device that is independent of a control device, and the virtual pipeline interface is constructed, so that the virtual pipeline configuration information is transmitted to the rendering device in response to the first pipeline configuration instruction. The virtual pipeline configuration information represents correspondences between a rendering pipeline stage, a resource rendering position, and a rendering resource identifier. This reduces a data transmission volume during an asynchronous rendering process, and can improve rendering efficiency.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing descriptions are only an example of this disclosure and are not intended to limit the scope of protection of this disclosure. Any modification, equivalent replacement, and improvement within the spirit and scope of this disclosure are included in the scope of protection of this disclosure.

What is claimed is:

1. A method of rendering resource-based data processing, comprising:

generating, by a control device, a first pipeline configuration instruction for one or more to-be-rendered resources in response to a rendering trigger event;

performing, by the control device, an initial pipeline configuration through an initial pipeline interface according to the first pipeline configuration instruction, to obtain initial pipeline configuration information, the initial pipeline configuration information including at least: a first to-be-rendered pipeline stage of a first to-be-rendered resource in the one or more to-be-rendered resources, a first rendering position of the first to-be-rendered resource, and a first to-be-rendered resource identifier of the first to-be-rendered resource; and transmitting the initial pipeline configuration information from the control device to a rendering device, the rendering device being configured to generate a second pipeline configuration instruction based on the initial pipeline configuration information, perform pipeline configuration through a pipeline interface according to the second pipeline configuration instruction to obtain a pipeline configuration result, and perform a rendering based on the pipeline configuration result.

2. The method according to claim 1, further comprising:

receiving, by the control device, a rendering resource request that is transmitted by the rendering device, the rendering resource request carrying the first to-be-rendered resource identifier of the first to-be-rendered resource;

obtaining, by the control device, according to the rendering resource request and from a rendering resource set, at least the first to-be-rendered resource with a matching identifier to the first to-be-rendered resource identifier; and transmitting the first to-be-rendered resource from the control device to the rendering device, the rendering device being configured to parse the initial pipeline configuration information based on the first to-be-rendered resource.

3. The method according to claim 1, further comprising:
transmitting a rendering resource set comprising the one or more to-be-rendered resources from the control device to the rendering device, the rendering device being configured to parse the initial pipeline configuration information based on the rendering resource set.

4. The method according to claim 3, wherein the generating comprises:
generating, when the rendering resource set is transmitted successfully, the first pipeline configuration instruction for the one or more to-be-rendered resources in response to the rendering trigger event.

5. The method according to claim 1, further comprising:
determining, at the control device, a rendering data identifier associated with a data calculation when the initial pipeline configuration is performed in response to the rendering trigger event;
transmitting a rendering data request carrying the rendering data identifier from the control device to the rendering device, the rendering device being configured to obtain target rendering data from a rendering result based on the rendering data identifier;
receiving, by the control device, the target rendering data transmitted by the rendering device in response to the rendering data request; and
performing, by the control device, the data calculation based on the target rendering data.

6. The method according to claim 1, further comprising:
receiving, by the control device, rendered video information transmitted by the rendering device, the rendered video information being generated by the rendering device based on a rendering result, the rendering result being obtained by the rendering device performing the rendering according to the initial pipeline configuration information; and
playing the rendered video information by the control device.

7. The method according to claim 1, further comprising:
obtaining a plurality of first computing capacities respectively for a plurality of central processing units in the control device;
determining a first total computing capacity based on the plurality of first computing capacities; and
generating, when the first total computing capacity is lower than a first computing capacity threshold, first update prompt information, the first update prompt information indicating that a need of an increase of the first total computing capacity.

8. A method of rendering resource-based data processing, comprising:
receiving, at a rendering device, initial pipeline configuration information that is transmitted by a control device, the initial pipeline configuration information being obtained by the control device according to a first pipeline configuration instruction and including at least a first to-be-rendered pipeline stage of a first to-be-rendered resource, a first to-be-rendered resource position of the first to-be-rendered resource, and a first to-be-rendered resource identifier of the first to-be-rendered resource;
generating, by the rendering device, a second pipeline configuration instruction based on the initial pipeline configuration information;
performing, by the rendering device, a pipeline configuration via a rendering pipeline interface according to the second pipeline configuration instruction, to obtain pipeline configuration result; and performing, by the rendering device, a rendering based on the pipeline configuration result, to obtain a rendering result.

9. The method according to claim 8, further comprising:
accessing, by the rendering device, a rendering resource library based on the first to-be-rendered resource identifier, the rendering resource library comprising a plurality of rendering resources in the rendering device that are obtained from the control device; and
determining, by the rendering device and when the rendering resource library comprises at least a first rendering resource with a matching identifier to the first to-be-rendered resource identifier, the first rendering resource as the first to-be-rendered resource corresponding to the first to-be-rendered resource identifier.

10. The method according to claim 8, further comprising:
accessing a rendering resource library of the rendering device based on the first to-be-rendered resource identifier, the rendering resource library comprising a plurality of rendering resources in the rendering device that are obtained from the control device;
transmitting, when the rendering resource library does not comprise a rendering resource with a matching identifier to the first to-be-rendered resource identifier, a rendering resource request carrying the first to-be-rendered resource identifier to the control device;
receiving the first to-be-rendered resource transmitted by the control device according to the rendering resource request, the first to-be-rendered resource having the matching identifier to the first to-be-rendered resource identifier; and
updating the rendering resource library with an addition of the first to-be-rendered resource having the matching identifier to the first to-be-rendered resource identifier.

11. The method according to claim 8, further comprising:
receiving a rendering resource set that is transmitted by the control device, the rendering resource set comprising a plurality of rendering resources;
accessing the rendering resource set based on the first to-be-rendered resource identifier to obtain a rendering resource with a matching identifier to the first to-be-rendered resource identifier; and
using the rendering resource as the first to-be-rendered resource with the first to-be-rendered resource identifier in the rendering.

12. The method according to claim 8, further comprising:
receiving a rendering data request transmitted by the control device, the rendering data request carrying a rendering data identifier associated with a data calculation of the control device;
obtaining, from the rendering result, target rendering data corresponding to the rendering data identifier; and
transmitting the target rendering data to the control device, the control device being configured to perform the data calculation based on the target rendering data.

13. The method according to claim 8, further comprising:
obtaining a device resource occupancy ratio of the rendering device;
detecting a rendering request when the device resource occupancy ratio is lower than a specified device resource occupancy ratio; and
performing, when the rendering request is detected, the rendering corresponding to the rendering request.

14. The method according to claim 8, further comprising:
obtaining a plurality of second computing capacities respectively for a plurality of graphics processing units in the rendering device;

determining a second total computing capacity based on the plurality of second computing capacities; and generating, when the second total computing capacity is lower than a second computing capacity threshold, second update prompt information, the second update prompt information indicating that a need of an increase of the second total computing capacity.

15. An apparatus that is a control device, comprising processing circuitry configured to:

generate a first pipeline configuration instruction for one or more to-be-rendered resources in response to a rendering trigger event;

perform a initial pipeline configuration through a initial pipeline interface according to the first pipeline configuration instruction, to obtain initial pipeline configuration information, the initial pipeline configuration information including at least: a first to-be-rendered pipeline stage of a first to-be-rendered resource in the one or more to-be-rendered resources, a first rendering position of the first to-be-rendered resource, and a first to-be-rendered resource identifier of the first to-be-rendered resource; and transmit the initial pipeline configuration information to a rendering device, the rendering device being configured to generate a second pipeline configuration instruction based on the initial pipeline configuration information, perform a pipeline configuration through a pipeline interface according to the second pipeline configuration instruction to obtain a pipeline configuration result, and perform a rendering based on the pipeline configuration result.

16. The apparatus according to claim 15, wherein the processing circuitry is configured to:

receive a rendering resource request that is transmitted by the rendering device, the rendering resource request carrying the first to-be-rendered resource identifier of the first to-be-rendered resource;

obtain according to the rendering resource request and from a rendering resource set, at least the first to-be-rendered resource with a matching identifier to the first to-be-rendered resource identifier; and transmit the first to-be-rendered resource from the control device to the rendering device, the rendering device being configured to parse the initial pipeline configuration information based on the first to-be-rendered resource.

17. The apparatus according to claim 15, wherein the processing circuitry is configured to:

transmit a rendering resource set comprising the one or more to-be-rendered resources from the control device to the rendering device, the rendering device being configured to parse the initial pipeline configuration information based on the rendering resource set.

18. The apparatus according to claim 17, wherein the processing circuitry is configured to:

generate, when the rendering resource set is transmitted successfully, the first pipeline configuration instruction for the one or more to-be-rendered resources in response to the rendering trigger event.

19. The apparatus according to claim 15, wherein the processing circuitry is configured to:

determine, at the control device, a rendering data identifier associated with a data calculation when the initial pipeline configuration is performed in response to the rendering trigger event;

transmit a rendering data request carrying the rendering data identifier from the control device to the rendering device, the rendering device being configured to obtain target rendering data from a rendering result based on the rendering data identifier;

receive the target rendering data transmitted by the rendering device in response to the rendering data request; and perform the data calculation based on the target rendering data.

20. The apparatus according to claim 15, wherein the processing circuitry is configured to:

receive rendered video information transmitted by the rendering device, the rendered video information being generated by the rendering device based on a rendering result, the rendering result being obtained by the rendering device performing the rendering according to the initial pipeline configuration information; and play the rendered video information.

* * * * *